United States Patent
Panandiker et al.

(10) Patent No.: US 10,781,402 B2
(45) Date of Patent: *Sep. 22, 2020

(54) LIQUID FABRIC ENHANCERS COMPRISING BRANCHED POLYESTER MOLECULES

(71) Applicant: The Procter & Gamble Company, Cincinnati, OH (US)

(72) Inventors: Rajan Keshav Panandiker, West Chester, OH (US); Bernard William Kluesener, Harrison, OH (US); Julie Ann Menkhaus, Cleves, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,162

(22) Filed: Jan. 29, 2019

(65) Prior Publication Data

US 2019/0233763 A1  Aug. 1, 2019

Related U.S. Application Data

(60) Provisional application No. 62/623,086, filed on Jan. 29, 2018.

(51) Int. Cl.

| *C11D 3/50* | (2006.01) |
| *C11D 3/00* | (2006.01) |
| *C08G 63/06* | (2006.01) |
| *C08G 63/664* | (2006.01) |
| *C11D 1/74* | (2006.01) |
| *C11D 1/62* | (2006.01) |
| *C11D 3/30* | (2006.01) |
| *C11D 3/37* | (2006.01) |
| *C11D 3/40* | (2006.01) |
| *C11D 11/00* | (2006.01) |

(52) U.S. Cl.
CPC ............ *C11D 3/0015* (2013.01); *C08G 63/06* (2013.01); *C08G 63/664* (2013.01); *C11D 1/62* (2013.01); *C11D 1/74* (2013.01); *C11D 3/30* (2013.01); *C11D 3/3715* (2013.01); *C11D 3/3742* (2013.01); *C11D 3/3773* (2013.01); *C11D 3/40* (2013.01); *C11D 3/505* (2013.01); *C11D 11/0017* (2013.01)

(58) Field of Classification Search
CPC ....... C11D 3/50; C11D 3/001; C11D 11/0017; C11D 9/44; C11D 17/041
See application file for complete search history.

(56) References Cited

U.S. PATENT DOCUMENTS

| 4,203,877 A | 5/1980 | Baker |
| 10,301,575 B2 | 5/2019 | Lynch |
| 2008/0255317 A1 | 10/2008 | Schaefer |
| 2011/0097369 A1 | 4/2011 | Sunder |
| 2011/0201533 A1 | 8/2011 | Ponder |
| 2013/0310301 A1* | 11/2013 | Sivik .................. C11D 1/62 510/516 |
| 2016/0024431 A1* | 1/2016 | Dykstra .............. C11D 3/001 8/137 |
| 2016/0304812 A1 | 10/2016 | Lynch |
| 2016/0312041 A1 | 10/2016 | Azemar |
| 2018/0051235 A1 | 2/2018 | Schubert et al. |
| 2019/0233763 A1 | 8/2019 | Panandiker |
| 2019/0233764 A1 | 8/2019 | Panandiker |
| 2019/0233786 A1 | 8/2019 | Panandiker |
| 2019/0367839 A1 | 12/2019 | Panandiker |
| 2019/0367841 A1 | 12/2019 | Panandiker |
| 2019/0367850 A1 | 12/2019 | Panandiker |

FOREIGN PATENT DOCUMENTS

| DE | 2430342 A1 | 1/1975 |
| WO | WO2012020992 A2 | 2/2012 |
| WO | 2013174622 | * 11/2013 |
| WO | WO2013174622 A1 | 11/2013 |
| WO | WO2016014745 A1 | 1/2016 |

OTHER PUBLICATIONS

International Search Report; International Application No. PCT/US2019/034480; dated Jul. 31, 2019; 15 pages.
International Search Report; International Application No. PCT/US2019/034481; dated Jul. 31, 2019; 14 pages.
International Search Report; International Application No. PCT/US2019/015496; dated Mar. 22, 2019; 13 pages.
International Search Report; International Application No. PCT/US2019/015497; dated Mar. 25, 2019; 14 pages.
U.S. Appl. No. 16/260,178, filed Jan. 29, 2019, Panandiker, et al.
U.S. Appl. No. 16/260,180, filed Jan. 29, 2019, Panandiker, et al.
All Office Actions for U.S. Appl. Nos. 16/425,989; 16/425,978; 16/425,991; 16/260,178 and 16/260,180.
Extended European Search Report; Application No. 19177497.5-1105; dated Jul. 31, 2019; 7 pages.

* cited by examiner

*Primary Examiner* — Charles I Boyer
(74) *Attorney, Agent, or Firm* — Gregory S. Darley-Emerson

(57) ABSTRACT

Liquid fabric enhancer compositions that include branched polyester compounds. Methods of making and using same.

15 Claims, No Drawings

LIQUID FABRIC ENHANCERS COMPRISING BRANCHED POLYESTER MOLECULES

FIELD OF THE INVENTION

The present invention relates to liquid fabric enhancers as well as methods of making and using same.

BACKGROUND OF THE INVENTION

Quaternary ammonium softeners are popularly used as softening actives in liquid fabric enhancers to soften fabrics. Unfortunately, these current softening actives have several drawbacks which include a narrow pH formulation window, less than desirable stability and/or softening performance. In an effort to alleviate such drawbacks, new softening actives continue to be developed. These include polymeric softening agents like silicone and polyethylene waxes. These softening actives deliver superior performance compared to conventional quaternary ammonium compounds. However, such softening actives are expensive, difficult to process and often not biodegradable.

Applicants recognized that the aforementioned drawbacks are due to one or more of the following factors: hydrolytic stability and lack of compatibility with anionic materials such as anionic surfactants for quaternary ammonium compounds; excessively high molecular weights and the high viscosity of the polymeric softening actives makes them difficult to process and dispose of. Further, synthetically derived polymeric materials are not as biodegradable as desired.

Applicants recognized that the branched polyester polymers disclosed in the present specification have the required molecular weight, iodine value and lubricity to allow them to serve as softening actives in a liquid fabric enhancer. When combined with certain fabric and home care ingredients, such branched polyester polymers can result in a liquid fabric enhancer that exhibits synergistic performance gains. Furthermore, branched polyester polymers of the type disclosed herein are easier to emulsify and process into a liquid fabric enhancer.

SUMMARY OF THE INVENTION

The present invention relates to liquid fabric enhances as well as methods of making and using same. Such liquid fabric enhancers contain branched polyester polymers that have the required molecular weight, iodine value and lubricity. Thus, such branched polyester polymers provide unexpectedly improved softening performance and formula ability.

DETAILED DESCRIPTION OF THE INVENTION

Definitions

As used herein, the number of carbon atoms in any group or compound can be represented by the terms: "$C_z$", which refers to a group of compounds having z carbon atoms; and "$C_{x-y}$", which refers to a group or compound containing from x to y, inclusive, carbon atoms. For example, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. As a further example, a "$C_{4-10}$ alkene" refers to an alkene molecule having from 4 to 10 carbon atoms, and, for example, includes, but is not limited to, 1-butene, 2-butene, isobutene, 1-pentene, 1-hexene, 3-hexene, 1-heptene, 3-heptene, 1-octene, 4-octene, 1-nonene, 4-nonene, and 1-decene.

As used herein, "alkyl" refers to a straight or branched chain saturated hydrocarbon having 1 to 30 carbon atoms, which may be optionally substituted, as herein further described, with multiple degrees of substitution being allowed. Examples of "alkyl," as used herein, include, but are not limited to, methyl, ethyl, n-propyl, isopropyl, isobutyl, n-butyl, sec-butyl, tert-butyl, isopentyl, n-pentyl, neopentyl, n-hexyl, and 2-ethylhexyl. The number of carbon atoms in an alkyl group is represented by the phrase "$C_{x-y}$ alkyl," which refers to an alkyl group, as herein defined, containing from x to y, inclusive, carbon atoms. Thus, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. In some instances, the "alkyl" group can be divalent, in which case the group can alternatively be referred to as an "alkylene" group.

As used herein, "alkenyl" refers to a straight or branched chain non-aromatic hydrocarbon having 2 to 30 carbon atoms and having one or more carbon-carbon double bonds, which may be optionally substituted, as herein further described, with multiple degrees of substitution being allowed. Examples of "alkenyl," as used herein, include, but are not limited to, ethenyl, 2-propenyl, 2-butenyl, and 3-butenyl. The number of carbon atoms in an alkenyl group is represented by the phrase "$C_{x-y}$ alkenyl," which refers to an alkenyl group, as herein defined, containing from x to y, inclusive, carbon atoms. Thus, "$C_{2-6}$ alkenyl" represents an alkenyl chain having from 2 to 6 carbon atoms and, for example, includes, but is not limited to, ethenyl, 2-propenyl, 2-butenyl, and 3-butenyl. In some instances, the "alkenyl" group can be divalent, in which case the group can alternatively be referred to as an "alkenylene" group.

As used herein, "direct bond" refers to an embodiment where the identified moiety is absent from the structure, and is replaced by a bond between other moieties to which it is connected. For example, if the specification or claims recite A-D-E and D is defined as a direct bond, the resulting structure is A-E.

As used herein, "substituted" refers to substitution of one or more hydrogen atoms of the designated moiety with the named substituent or substituents, multiple degrees of substitution being allowed unless otherwise stated, provided that the substitution results in a stable or chemically feasible compound. A stable compound or chemically feasible compound is one in which the chemical structure is not substantially altered when kept at a temperature from about −80° C. to about +40° C., in the absence of moisture or other chemically reactive conditions, for at least a week. As used herein, the phrases "substituted with one or more . . . " or "substituted one or more times . . . " refer to a number of substituents that equals from one to the maximum number of substituents possible based on the number of available bonding sites, provided that the above conditions of stability and chemical feasibility are met.

As used herein, the various functional groups represented will be understood to have a point of attachment at the functional group having the hyphen or dash (-) or an asterisk (*). In other words, in the case of —$CH_2CH_2CH_3$, it will be understood that the point of attachment is the $CH_2$ group at the far left. If a group is recited without an asterisk or a dash, then the attachment point is indicated by the plain and ordinary meaning of the recited group.

As used herein, multi-atom bivalent species are to be read from left to right. For example, if the specification or claims recite A-D-E and D is defined as —OC(O)—, the resulting group with D replaced is: A-OC(O)-E and not A-C(O)O-E.

As used herein, the articles including "a" and "an" when used in a claim, are understood to mean one or more of what is claimed or described.

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated with the proviso that the sum of the percentage of all ingredients for a respective mixture/formula cannot exceed or be less than 100%.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Compositions, Methods of Making, Methods of Use and Treated Articles

A) A liquid fabric enhancer having a pH of from about 2 to about 5, said liquid fabric enhancer comprising, based on total liquid fabric enhancer weight, from about 1% to about 50%, of a branched polyester selected from the group consisting of:
(i) a branched polyester having Formula 1

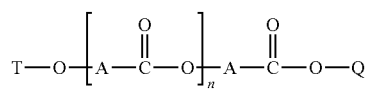

Formula 1 wherein:
each A is independently a branched hydrocarbon chain comprising 4 to 100 carbon atoms;
Q is selected from an alkyl chain comprising 1 to 30 carbon atoms and a hydrogen atom;
T is a hydrogen atom or a —C(O)—R wherein each R is an alkyl chain comprising 1 to 30 carbon atoms and
n is an integer from 1 to about 100;
(ii) a branched polyester having Formula 2

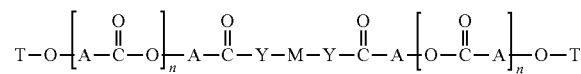

wherein
each n is independently an integer from 1 to about 100;

each A is independently a branched hydrocarbon chain comprising 4 to 100 carbon atoms;
each T is independently a hydrogen atom or a —C(O)—R wherein
each R is an alkyl chain comprising 1 to 30 carbon atoms;
each Y is independently a linking group selected from the group consisting of oxygen and $NR_2$, wherein each $R_2$ is independently selected from the group consisting of hydrogen, or a $C_1$-$C_8$ alkyl;
M is a polyalkylene glycol group; and
(iii) mixtures thereof, is disclosed.

B) A liquid fabric enhancer according to Paragraph A) having a pH of from about 2 to about 5, preferably from about 2 to about 4, said liquid fabric enhancer comprising, based on total liquid fabric enhancer weight, from about 1% to about 40%, preferably from about 3% to about 35%, more preferably from 4% to 30% of said branched polyester said branched polyester polymer being selected from the group consisting of:
(i) the branched polyester of the Formula 1

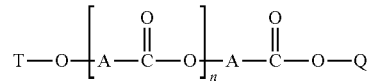

Formula 1 wherein:
each A is independently a branched hydrocarbon chain comprising from 4 to 40 carbon atoms, preferably from 12 to 20 carbon atoms, more preferably 17 carbon atoms
Q is selected from an alkyl chain comprising 1 to 30 carbon atoms and a hydrogen atom, preferably Q is a hydrogen atom;
T is a hydrogen atom or a —C(O)—R wherein each R is an alkyl chain comprising from 7 to 21 carbon atoms, preferably from 11 to 17 carbon atoms and
n is an integer from 4 to 40, preferably n is an integer from 5 to 20
(ii) the branched polyester of the Formula 2

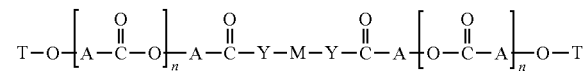

wherein:
n is an integer from 4 to 40, preferably n is an integer from 5 to 20
each A is independently a branched hydrocarbon chain comprising from 4 to 40 carbon atoms, preferably from 12 to 20 carbon atoms, more preferably 17 carbon atoms
each T is independently a hydrogen atom or a —C(O)—R wherein each R is an alkyl chain comprising from 7 to 21 carbon atoms, preferably from 11 to 17 carbon atoms;
each Y is independently a linking group selected from the group consisting of oxygen and $NR_2$, wherein each $R_2$ is independently selected from the group consisting of hydrogen, or a $C_1$-$C_8$ alkyl, preferably each $R_2$ is hydrogen;

M is a polyalkylene glycol group, preferably M has the structure

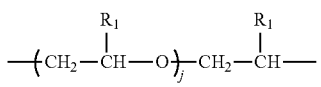

wherein
each $R_1$ is selected from hydrogen, methyl and ethyl;
j is an integer from 0 to about 400, preferably from 2 to about 50; and
(iii) mixtures thereof,
is disclosed.
C) A liquid fabric enhancer according to any of Paragraphs A) or B) wherein said branched polyester polymers having Formula 1 and Formula 2 each have a weight average molecular weight of from about 500 g/mol to about 100,000 g/mol, preferably from about 1000 g/mol to about 60,000 g/mol, more preferably from about 1000 g/mol to about 10,000 g/mol, most preferably from about 1000 g/mol to about 5,000 g/mol, is disclosed.
D) A liquid fabric enhancer according to any Paragraphs A) through C), wherein each A of said branched polyester polymers is independently a branched hydrocarbon with the structure

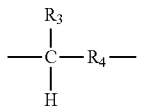

wherein each $R_3$ is a monovalent alkyl or substituted alkyl group and $R_4$ is an unsaturated or saturated divalent alkylene radical comprising from 1 to about 24 carbon atoms, preferably each $R_3$ is a monovalent alkyl radical comprising 6 carbon atoms and each $R_4$ is an unsaturated or saturated divalent alkylene radical comprising from 10 carbon atoms, is disclosed.
E) A liquid fabric enhancer according to any Paragraphs A) through D), wherein each A of said branched polyester polymers has the structure:

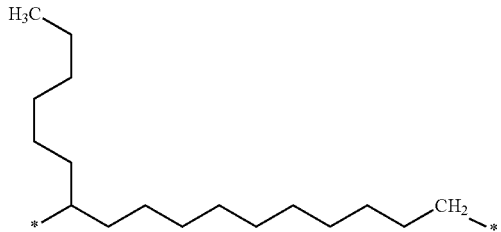 [SMILES: *CCCCCCCCCCC(*)CCCCCC]

is disclosed.
F) A liquid fabric enhancer according to Paragraphs A) or B) wherein said branched polyester polymers each have an iodine value from about 0 to about 90, preferably from about 0.4 to about 50, most preferably from about 1 to about 30.
G) A liquid fabric enhancer according to any Paragraphs A) through F), said liquid fabric enhancer comprising, based on total liquid fabric enhancer weight, from about 1% to 50%, preferably 2% to about 30%, more preferably from about 3% to about 20%, most preferably 3% to about 15% of a fabric softener active, preferably said fabric softening active is selected from the group consisting of a quaternary ammonium compound, an amine, a fatty ester, a sucrose ester, a silicone, a dispersible polyolefin, a polysaccharide, a fatty acid, a softening oil, a polymer latex, a softening clay and mixtures thereof, more preferably said fabric softening active is selected from the group consisting of ester quats, amide quats, imidazoline quats, alkyl quats, amidoester quats and combinations thereof, more preferably said fabric softening active is selected from the group consisting of monoester quats, diester quats, triester quats and mixtures thereof, most preferably, said fabric softening active is selected from the group consisting of bis-(2-hydroxypropyl)-dimethylammonium methylsulphate fatty acid ester, 1,2-di(acyloxy)-3-trimethylammoniopropane chloride, N, N-bis(stearoyl-oxy-ethyl)-N,N-dimethyl ammonium chloride, N,N-bis(tallowoyl-oxy-ethyl) N,N-dimethyl ammonium chloride, N,N-bis(stearoyl-oxy-ethyl) N-(2 hydroxyethyl)-N-methyl ammonium methylsulfate, N,N-bis-(stearoyl-2-hydroxypropyl)-N,N-dimethylammonium methylsulphate, N,N-bis-(tallowoyl-2-hydroxypropyl)-N,N-dimethylammonium methylsulphate, N,N-bis-(palmitoyl-2-hydroxypropyl)-N,N-dimethylammonium methylsulphate, N,N-bis-(stearoyl-2-hydroxypropyl)-N,N-dimethylammonium chloride, 1, 2 di (stearoyl-oxy) 3 trimethyl ammoniumpropane chloride, dicanoladimethylammonium chloride, di(hard)tallowdimethylammonium chloride dicanoladimethylammonium methylsulfate, Dipalmethyl Hydroxyethylammoinum Methosulfate and mixtures thereof, is disclosed.
H) A liquid fabric enhancer according to any of Paragraphs A) through G), said liquid fabric enhancer comprising, based on total liquid fabric enhancer weight, material selected from the group consisting of one or more of the following:
(i) from about 0.001% to about 15% of an anionic surfactant scavenger;
(ii) from about 0.01% to about 10%, of a delivery enhancing agent;
(iii) from about 0.005% to about 30% of a perfume;
(iv) from about 0.005% to about 30% of a perfume delivery system, preferably a perfume capsule, more preferably a perfume capsule comprising a shell and a core comprising perfume, said shell encapsulating said core, said shell comprising a polyacrylate and/or an amnioplast, most preferably said perfume capsule has diameter of from about 1 micron to 200 microns or from 1 micron to 100 microns;
(v) from about 0.0001% to about 10% of a hueing dye;
(vi) from about 0.0001% to about 10% of a dye transfer inhibiting agent;
(vii) from about 0.01% to about 20% of a structurant;
(viii) from about 0.05% to about 20% of a fabric care benefit agent; and
(ix) from about 0.05% to about 10% a surfactant;
(x) a carrier
(xi) mixtures thereof, is disclosed.
I) A liquid fabric enhancer according to Paragraph H) wherein:
(i) said anionic surfactant scavenger comprises a water soluble cationic and/or zwitterionic scavenger compound;
(ii) said delivery enhancing agent comprises a material selected from the group consisting of a cationic polymer having a charge density from about 0.05 milliequivalent/g to about 23 milliequivalent per gram of polymer, an amphoteric polymer having a charge density from about 0.05 milliequivalent/g to about 23 milliequivalent per gram of polymer, a protein having a charge density from about 0.05 milliequivalent/g to about 23 milliequivalent per gram of protein and mixtures thereof;
(iii) said perfume delivery system is selected from the group consisting of Polymer Assisted Delivery system, Molecule-Assisted Delivery system, Cyclodextrin system, Starch Encapsulated Accord system, Zeolite & Inorganic Carrier system, and mixtures thereof
(iv) said hueing dye comprising a moiety selected the group consisting of acridine, anthraquinone, azine, azo, benzodifurane and benzodifuranone, carotenoid, coumarin, cyanine, diazahemicyanine, diphenylmethane, formazan, hemicyanine, indigoid, methane, naphthalimide, naphthoquinone, nitro and nitroso, oxazine, phthalocyanine, pyrazole, stilbene, styryl, triarylmethane, triphenylmethane, xanthene and mixtures thereof;
(v) said dye transfer inhibiting agent is selected from the group consisting polyvinylpyrrolidone polymers, polyamine N-oxide polymers, copolymers of N-vinylpyrrolidone and N-vinylimidazole, polyvinyloxazolidones and polyvinylimidazoles or mixtures thereof;
(vi) said structurant is selected from the group consisting of hydrogenated castor oil, gellan gum, starches, derivatized starches, carrageenan, guar gum, pectin, xanthan gum, modified celluloses, microcrystalline celluloses modified proteins, hydrogenated polyalkylenes, non-hydrogenated polyalkenes, inorganic salts, clay, homo- and co-polymers comprising cationic monomers selected from the group consisting of N,N-dialkylaminoalkyl methacrylate, N,N-dialkylaminoalkyl methyl methacrylate, N,N-dialkylaminoalkyl acrylate, N,N-dialkylaminoalkyl acrylamide, N,N-dialkylaminoalkylmethacrylamide, quaternized N,N-dialkylaminoalkyl methacrylate, quaternized N,N-dialkylaminoalkyl methyl methacrylate, quaternized N,N-dialkylaminoalkyl acrylate, quaternized N,N-dialkylaminoalkyl acrylamide, quaternized N,N-dialkylaminoalkylmethacrylamide, and mixtures thereof;
(vii) said fabric care benefit agent is selected from the group consisting of polyglycerol esters, oily sugar derivatives, wax emulsions, silicones, polyisobutylene, polyolefins and mixtures thereof;
(viii) said surfactant is selected from the group consisting of, nonionic surfactants, ampholytic surfactants, cationic surfactants, zwitterionic surfactants, and mixtures thereof
(ix) said carrier is selected from the group consisting of water, 1,2-propanediol, hexylene glycol, ethanol, isopropanol, glycerol, $C_1$-$C_4$ alkanolamines, salts, sugars, polyalkylene oxides; polyethylene glycols; polypropylene oxide, and mixtures thereof.

J) A liquid fabric enhancer according to Paragraph H) wherein:
(i) said anionic surfactant scavenger is selected from the group consisting of monoalkyl quaternary ammonium compounds, amine precursors of monoalkyl quaternary ammonium compounds, dialkyl quaternary ammonium compounds, and amine precursors of dialkyl quaternary ammonium compounds, polyquaternary ammonium compounds, amine precursors of polyquaternary ammonium compounds, and mixtures thereof;
(ii) said delivery enhancing agent is selected from the group consisting of cationic polysaccharides, polyethyleneimine and its derivatives, polyamidoamines and homopolymers, copolymers and terpolymers made from one or more cationic monomers selected from the group consisting of N,N-dialkylaminoalkyl methacrylate, N,N-dialkylaminoalkyl methyl methacrylate, N,N-dialkylaminoalkyl acrylate, N,N-dialkylaminoalkyl acrylamide, N,N-dialkylaminoalkylmethacrylamide, quaternized N,N-dialkylaminoalkyl methacrylate, quaternized N,N-dialkylaminoalkyl methyl methacrylate, quaternized N,N-dialkylaminoalkyl acrylate, quaternized N,N-dialkylaminoalkyl acrylamide, quaternized N,N-dialkylaminoalkylmethacrylamide, vinylamine and its derivatives, allylamine and its derivatives, vinyl imidazole, quaternized vinyl imidazole and diallyl dialkyl ammonium chloride and combinations thereof, and optionally a second monomer selected from the group consisting of acrylamide, N,N-dialkyl acrylamide, methacrylamide, N,N-dialkylmethacrylamide, $C_1$-$C_{12}$ alkyl acrylate, $C_1$-$C_{12}$ hydroxyalkyl acrylate, polyalkylene glyol acrylate, $C_1$-$C_{12}$ alkyl methacrylate, $C_1$-$C_{12}$ hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole and derivatives, acrylic acid, methacrylic acid, maleic acid, vinyl sulfonic acid, styrene sulfonic acid, acrylamidopropylmethane sulfonic acid (AMPS) and their salts, and combinations thereof;
(iii) said surfactant is selected from the group consisting of alkyl sulfate, alkyl ethoxysulfate, linear alkylbenzene sulfonate, alpha olefin sulfonate, ethoxylated alcohols, ethoxylated alkyl phenols, fatty acids, soaps, and mixtures thereof;
(iv) said fabric care benefit agent is selected from the group consisting of polydimethylsiloxane, silicone polyethers, cationic silicone, aminosilicone, and mixtures thereof, is disclosed.

K) A liquid fabric enhancer according to any of Paragraphs A) through F) comprising:
(i) a quaternary ammonium ester softening active of the following formula:

$\{R2(4-m)-N+-[X—Y—R1]m\}A-$ wherein:
m is 1, 2 or 3 with proviso that the value of each m is identical;
each R1 is independently hydrocarbyl, or branched hydrocarbyl group, preferably R1 is linear, more preferably R1 is partially unsaturated linear alkyl chain;
each R2 is independently a C1-C3 alkyl or hydroxyalkyl group, preferably R2 is selected from methyl, ethyl, propyl, hydroxyethyl, 2-hydroxypropyl, 1-methyl-2 hydroxyethyl, poly(C2-C3¬ alkoxy), polyethoxy, benzyl;
each X is independently —(CH2)n-, —CH2-CH(CH3)- or —CH—(CH3)-CH2- and
each n is independently 1, 2, 3 or 4, preferably each n is 2;
each Y is independently —O—(O)C— or —C(O)—O—;
A- is independently selected from the group consisting of chloride, methyl sulfate, and ethyl sulfate, preferably A- is selected from the group consisting of chloride and methyl sulfate, more preferably A- is methyl sulfate;
with the proviso that when Y is —O—(O)C—, the sum of carbons in each R1 is from 13 to 21, preferably from 13 to 19, preferably said fabric softener active is selected from the group consisting of bis-(2-hydroxypropyl)- dimethylammonium methylsulphate fatty acid ester, 1,2-di(acyloxy)-3-trimethylammoniopropane chloride, N, N-bis(stearoyl-oxy-ethyl)-N,N-dimethyl ammonium chloride, N,N-bis(tallowoyl-oxy-ethyl) N,N-dimethyl ammonium chloride, N,N-bis(stearoyl-oxy-ethyl) N-(2 hydroxyethyl)-N-methyl ammonium methylsulfate, N,N-bis-(stearoyl-2-hydroxypropyl)-N,N-dimethylammonium methylsulphate, N,N-bis-(tallowoyl-2-hydroxypropyl)-N,N-dimethylammonium methylsulphate, N,N-bis-(palmitoyl-2-hydroxypropyl)-N,N-dimethylammonium methylsulphate, N,N-bis-(stearoyl-2-hydroxypropyl)-N,N-dimethylammonium chloride, 1, 2 di (stearoyl-oxy) 3 trimethyl ammoniumpropane chloride, dicanoladimethylammonium chloride, di(hard)tallowdimethylammonium chloride, dicanoladimethylammonium methylsulfate, 1-methyl-1-stearoylamidoethyl-2-stearoylimidazolinium methylsulfate, 1-tallowylamidoethyl-2-tallowylimidazoline, Dipalmethyl Hydroxyethylammoinum Methosulfate and mixtures thereof;
(ii) a carrier,
(iii) optionally, an anionic surfactant scavenger selected from the group consisting of a monoalkyl quaternary ammonium compounds and amine precursors thereof, dialkyl quaternary ammonium compounds and amine precursors thereof, polyquaternary ammonium compounds and amine precursors thereof, polymeric amines, and mixtures thereof;
(iv) optionally, a delivery enhancing agent selected from the group consisting of a cationic polymer having a charge density from about 0.05 milliequivalent/g to about 23 milliequivalent per gram of polymer, an amphoteric polymer having a charge density from about 0.05 milliequivalent/g to about 23 milliequivalent per gram of polymer, a protein having a charge density from about 0.05 milliequivalent/g to about 23 milliequivalent per gram of protein and mixtures thereof;
(v) optionally, a dye transfer inhibiting agent selected from the group consisting of polyvinylpyrrolidone polymers, polyamine N-oxide polymers, copolymers of N-vinylpyrrolidone and N-vinylimidazole, polyvinyloxazolidones and polyvinylimidazoles or mixtures thereof;
(vi) optionally, a structurant selected from the group consisting of hydrogenated castor oil, gellan gum, starches, derivatized starches, carrageenan, guar gum, pectin, xanthan gum, modified celluloses, microcyrstalline celluloses, modified proteins, hydrogenated polyalkylenes, non-hydrogenated polyalkenes, inorganic salts selected from the group consisting of magnesium chloride, calcium chloride, calcium formate, magnesium formate, aluminum chloride, potassium permanganate and mixtures thereof, clay, homo- and co-polymers comprising cationic monomers selected from the group consisting of N,N-dialkylaminoalkyl methacrylate, N,N-dialkylaminoalkyl methyl methacrylate, N,N-dialkylaminoalkyl acrylate, N,N-dialkylaminoalkyl acrylamide, N,N-dialkylaminoalkylmethacrylamide, quaternized N,N-dialkylaminoalkyl methacrylate, quaternized N,N-dialkylaminoalkyl methyl methacrylate, quaternized N,N-dialkylaminoalkyl acrylate, quaternized N,N-dialkylaminoalkyl acrylamide, quaternized N,N-dialkylaminoalkylmethacrylamide, and mixtures thereof; and
(vii) optionally, a fabric care benefit agent selected from the group consisting of polyglycerol esters, oily sugar derivatives, wax emulsions, silicones, polyisobutylene, polyolefins and mixtures thereof; and
(viii) optionally a perfume; and
(ix) optionally a perfume delivery system;
said liquid fabric enhancer having a pH of from about 2 to about 5, preferably from about 2 to about 4, is disclosed.

L) A liquid fabric enhancer according to any of Paragraphs A) through G) comprising:
(i) a surfactant selected from the group consisting of anionic surfactants, nonionic surfactants, ampholytic surfactants, cationic surfactants, zwitterionic surfactants, and mixtures thereof;
(ii) a carrier;
(iii) optionally, a builder selected from the group consisting of phosphate salts, water-soluble, nonphosphorus organic builders, alkali metal, ammonium and substituted ammonium polyacetates, carboxylates, polycarboxylates, polyhydroxy sulfonates, and mixtures thereof;
(iv) optionally, a soil dispersing polymer selected from the group consisting of a homopolymer copolymer or terpolymer of an ethylenically unsaturated monomer anionic monomer, alkoxylated polyamines and mixtures thereof;
(v) optionally, a delivery enhancing agent selected from the group consisting of a cationic polymer having a charge density from about 0.05 milliequivalent/g to about 23 milliequivalent per gram of polymer, an amphoteric polymer having a charge density from about 0.05 milliequivalent/g to about 23 milliequivalent per gram of polymer, a protein having a charge density from about 0.05 milliequivalent/g to about 23 milliequivalent per gram of protein and mixtures thereof;
(vi) optionally, a brightener selected from the group consisting of derivatives of stilbene or 4,4'-diaminostilbene, biphenyl, five-membered heterocycles, pyrazolines, oxazoles, imidiazoles, six-membered heterocycles, and mixtures thereof;
(vii) optionally, a hueing dye comprising a moiety selected the group consisting of acridine, anthraquinone azine, azo, benzodifurane and benzodifuranone, carotenoid, coumarin, cyanine, diazahemicyanine, diphenylmethane, formazan, hemicyanine, indigoid, methane, naphthalimide, naphthoquinone, nitro and nitroso, oxazine, phthalocyanine, pyrazole, stilbene, styryl, triarylmethane, triphenylmethane, xanthene and mixtures thereof;
(viii) optionally, a dye transfer inhibiting agent selected from the group consisting polyvinylpyrrolidone polymers, polyamine N-oxide polymers, copolymers of N-vinylpyrrolidone and N-vinylimidazole, polyvinyloxazolidones and polyvinylimidazoles or mixtures thereof;
(ix) optionally, a structurant selected from the group consisting of hydrogenated castor oil, gellan gum, starches, derivatized starches, carrageenan, guar gum, pectin, xanthan gum, modified celluloses, microcyrstalline celluloses, modified proteins, hydrogenated polyalkylenes, non-hydrogenated polyalkenes, inorganic salts, clay, homo- and co-polymers comprising cationic monomers selected from the group consisting of N,N-dialkylaminoalkyl methacrylate, N,N-dialkylaminoalkyl methyl methacrylate N,N-dialkylaminoalkyl acrylate, N,N-dialkylaminoalkyl acrylamide, N,N-dialkylaminoalkylmethacrylamide, quaternized N,N-dialkylaminoalkyl methacrylate, quaternized N,N-dialkylaminoalkyl methyl methacrylate, quaternized N,N-dialkylaminoalkyl acrylate, quaternized N,N-dialkylaminoalkyl acrylamide, quaternized N,N-dialkylaminoalkylmethacrylamide, and mixtures thereof;
  (x) optionally, a fabric care benefit agent selected from the group consisting of polyglycerol esters, oily sugar derivatives, wax emulsions, silicones, polyisobutylene, polyolefins and mixtures thereof; and
  (xi) optionally a perfume;
  (xii) optionally a perfume delivery system;
  said liquid fabric enhancer having a pH of from about 2 to about 5, preferably from about 2 to about 4, is disclosed.
M) A liquid fabric enhancer according to any of Paragraphs A) through F) comprising:
  (i) a fabric softening agent, a perfume, and a delivery enhancing agent; or
  (ii) a fabric softening agent, a perfume and a perfume delivery system; or
  (iii) a hueing dye and a surfactant; or
  (v) a fabric softening agent, a fabric care benefit agent and a delivery enhancing agent; or
  (vi) a fabric care benefit agent, anionic surfactant scavenger and a delivery enhancing agent; or
  (vii) a perfume delivery system, is disclosed.

Liquid Fabric Enhancer Materials

Materials that are useful in the liquid fabric enhancers of the present invention include: surfactants, delivery enhancing agents, chelating agents, dye transfer inhibiting agents, dispersants, and enzyme stabilizers, polymeric dispersing agents, clay and soil removal/anti-redeposition agents, brighteners, suds suppressors, dyes, additional perfumes and perfume delivery systems, structure elasticizing agents, fabric softener actives, fabric care benefit agents, anionic surfactant scavengers, carriers, hydrotropes, processing aids, structurants, anti-agglomeration agents, coatings, formaldehyde scavengers and/or pigments. Other embodiments of Applicants' compositions do not contain one or more of the following adjuncts materials: bleach activators, surfactants, delivery enhancing agents, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softener actives, fabric care benefit agents, anionic surfactant scavengers, carriers, hydrotropes, processing aids, structurants, anti-agglomeration agents, coatings, formaldehyde scavengers and/or pigments. The precise nature of these additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

Delivery Enhancing Agent: The compositions may comprise from about 0.01% to about 10% of the composition of a delivery enhancing agent. As used herein, such term refers to any polymer or combination of polymers that significantly enhance the deposition of the fabric care benefit agent onto the fabric during laundering. Preferably, delivery enhancing agent may be a cationic or amphoteric polymer. The cationic charge density of the polymer ranges from about 0.05 milliequivalents/g to about 23 milliequivalents/g. The charge density may be calculated by dividing the number of net charge per repeating unit by the molecular weight of the repeating unit. In one aspect, the charge density varies from about 0.05 milliequivalents/g to about 8 milliequivalents/g. The positive charges could be on the backbone of the polymers or the side chains of polymers. For polymers with amine monomers, the charge density depends on the pH of the carrier. For these polymers, charge density may be measured at a pH of 7. Non-limiting examples of deposition enhancing agents are cationic or amphoteric, polysaccharides, proteins and synthetic polymers. Cationic polysaccharides include cationic cellulose derivatives, cationic guar gum derivatives, chitosan and derivatives and cationic starches. Cationic polysaccharides have a molecular weight from about 50,000 to about 2 million, preferably from about 100,000 to about 1,500,000. Suitable cationic polysaccharides include cationic cellulose ethers, particularly cationic hydroxyethylcellulose and cationic hydroxypropylcellulose. Examples of cationic hydroxyalkyl cellulose include those with the INCI name Polyquaternium10 such as those sold under the trade names Ucare Polymer JR 30M, JR 400, JR 125, LR 400 and LK 400 polymers; Polyquaternium 67 such as those sold under the trade name Softcat SK™, all of which are marketed by Amerchol Corporation, Edgewater N.J.; and Polyquaternium 4 such as those sold under the trade name Celquat H200 and Celquat L-200 available from National Starch and Chemical Company, Bridgewater, N.J. Other suitable polysaccharides include Hydroxyethyl cellulose or hydoxypropylcellulose quaternized with glycidyl $C_{12}$-$C_{22}$ alkyl dimethyl ammonium chloride. Examples of such polysaccharides include the polymers with the INCI names Polyquaternium 24 such as those sold under the trade name Quaternium LM 200 by Amerchol Corporation, Edgewater N.J. Cationic starches refer to starch that has been chemically modified to provide the starch with a net positive charge in aqueous solution at pH 3. This chemical modification includes, but is not limited to, the addition of amino and/or ammonium group(s) into the starch molecules. Non-limiting examples of these ammonium groups may include substituents such as trimethylhydroxypropyl ammonium chloride, dimethylstearylhydroxypropyl ammonium chloride, or dimethyldodecylhydroxypropyl ammonium chloride. The source of starch before chemical modification can be chosen from a variety of sources including tubers, legumes, cereal, and grains. Non-limiting examples of this source of starch may include corn starch, wheat starch, rice starch, waxy corn starch, oat starch, cassaya starch, waxy barley, waxy rice starch, glutenous rice starch, sweet rice starch, amioca, potato starch, tapioca starch, oat starch, sago starch, sweet rice, or mixtures thereof. Nonlimiting examples of cationic starches include cationic maize starch, cationic tapioca, cationic potato starch, or mixtures thereof. The cationic starches may comprise amylase, amylopectin, or maltodextrin. The cationic starch may comprise one or more additional modifications. For example, these modifications may include cross-linking, stabilization reactions, phophorylations, hydrolyzations, cross-linking. Stabilization reactions may include alkylation and esterification. Suitable cationic starches for use in the present compositions are commercially-available from Cerestar under the trade name C*BOND® and from National Starch and Chemical Company under the trade name CATO® 2A. Cationic galactomannans include cationic guar gums or cationic locust bean gum. An example of a cationic guar gum is a quaternary ammonium derivative of Hydroxypropyl Guar such as those sold under the trade name Jaguar C13 and Jaguar Excel available from Rhodia, Inc of Cranbury N.J. and N-Hance by Aqualon, Wilmington, Del.

In one aspect, a synthetic cationic polymer may be used as the delivery enhancing agent. The molecular weight of these polymers may be in the range of from about 2,000 to about 5 million kD. Synthetic polymers include synthetic addition polymers of the general structure

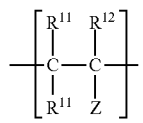

wherein each $R^{11}$ may be independently hydrogen, $C_1$-$C_{12}$ alkyl, substituted or unsubstituted phenyl, substituted or unsubstituted benzyl, —$OR_e$, or —$C(O)OR_e$ wherein $R_e$ may be selected from the group consisting of hydrogen, $C_1$-$C_{24}$ alkyl, and combinations thereof. In one aspect, $R^{11}$ may be hydrogen, $C_1$-$C_4$ alkyl, or —$OR_e$, or —$C(O)OR_e$ wherein each $R^{12}$ may be independently selected from the group consisting of hydrogen, hydroxyl, halogen, $C_1$-$C_{12}$ alkyl, —$OR_e$, substituted or unsubstituted phenyl, substituted or unsubstituted benzyl, carbocyclic, heterocyclic, and combinations thereof. In one aspect, $R^{12}$ may be selected from the group consisting of hydrogen, $C_1$-$C_4$ alkyl, and combinations thereof.

Each Z may be independently hydrogen, halogen; linear or branched $C_1$-$C_{30}$ alkyl, nitrilo, $N(R^{13})_2$—$C(O)N(R^{13})_2$; —NHCHO (formamide); —$OR^{13}$, —$O(CH_2)_nN(R^{13})_2$, —$O(CH_2)_nN^+(R^{13})_3X^-$, —$C(O)OR^{14}$; —$C(O)N$—$(R^{13})_2$; —$C(O)O(CH_2)_nN(R^{13})_2$, —$C(O)O(CH_2)_nN^+(R^{13})_3X$, —$OCO(CH_2)_nN(R^{13})_2$, —$OCO(CH_2)_nN^+(R^{13})_3X^-$, —$C(O)NH(CH_2)_nN(R^{13})_2$, —$C(O)NH(CH_2)_nN^+(R^{13})_3X^-$, —$(CH_2)_n N(R^{13})_2$, —$(CH2)_nN^+(R^{13})_3X^-$, Each $R^{13}$ may be independently selected from the group consisting of hydrogen, $C_1$-$C_{24}$ alkyl, $C_2$-$C_8$ hydroxyalkyl, benzyl, substituted benzyl, and combinations thereof;

Each $R^{14}$ may be independently selected from the group consisting of hydrogen, $C_1$-$C_{24}$ alkyl,

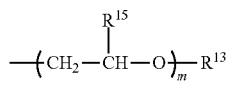

wherein m is 0 to 1,000, and $R^{15}$ may be independently selected from the group consisting of hydrogen, $C_1$-$C_6$ alkyl, and combinations thereof;
and combinations thereof.

X may be a water-soluble anion wherein n may be from about 1 to about 6.

Z may also be selected from the group consisting of non-aromatic nitrogen heterocycles containing a quaternary ammonium ion, heterocycles containing an N-oxide moiety, aromatic nitrogens containing heterocycles wherein one or more or the nitrogen atoms may be quaternized; aromatic nitrogen-containing heterocycles wherein at least one nitrogen may be an N-oxide; and combinations thereof. Non-limiting examples of addition polymerizing monomers comprising a heterocyclic Z unit includes 1-vinyl-2-pyrrolidinone, 1-vinylimidazole, quaternized vinyl imidazole, 2-vinyl-1,3-dioxolane, 4-vinyl-1-cyclohexene1, 2-epoxide, and 2-vinylpyridine, 2-vinylpyridine N-oxide, 4-vinylpyridine 4-vinylpyridine N-oxide.

A non-limiting example of a Z unit which can be made to form a cationic charge in situ may be the —NHCHO unit, formamide. The formulator can prepare a polymer or co-polymer comprising formamide units some of which are subsequently hydrolyzed to form vinyl amine equivalents.

The polymers or co-polymers may also contain one or more cyclic polymer units derived from cyclically polymerizing monomers. An example of a cyclically polymerizing monomer is dimethyl diallyl ammonium.

Suitable copolymers may be made from one or more cationic monomers selected from the group consisting of N,N-dialkylaminoalkyl methacrylate, N,N-dialkylaminoalkyl methyl methacrylate, N,N-dialkylaminoalkyl acrylate, N,N-dialkylaminoalkyl acrylamide, N,N-dialkylaminoalkylmethacrylamide, quaternized N,N-dialkylaminoalkyl methacrylate, quaternized N,N-dialkylaminoalkyl methyl methacrylate, quaternized N,N-dialkylaminoalkyl acrylate, quaternized N,N-dialkylaminoalkyl acrylamide, quaternized N,N-dialkylaminoalkylmethacrylamide, vinylamine and its derivatives, allylamine and its derivatives, vinyl imidazole, quaternized vinyl imidazole and diallyl dialkyl ammonium chloride and combinations thereof, and optionally a second monomer selected from the group consisting of acrylamide, N,N-dialkyl acrylamide, methacrylamide, N,N-dialkylmethacrylamide, $C_1$-$C_{12}$ alkyl acrylate, $C_1$-$C_{12}$ hydroxyalkyl acrylate, polyalkylene glyol acrylate, $C_1$-$C_{12}$ alkyl methacrylate, $C_1$-$C_{12}$ hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole and derivatives, acrylic acid, methacrylic acid, methyl methacrylate, itaconic acid, fumaric acid, 3-allyloxy-2-hydroxy-1-propane-sulfonic acid (HAPS) and their salts, allyl sulfonic acid and their salts, maleic acid, vinyl sulfonic acid, styrene sulfonic acid, acrylamidopropylmethane sulfonic acid (AMPS) and their salts, and combinations thereof. The polymer may optionally be cross-linked. Suitable crosslinking monomers include ethylene glycoldiacrylate, divinylbenzene, and butadiene.

In one aspect, the synthetic polymers are poly(acrylamide-co-diallyldimethylammonium chloride), poly(acrylamide-methacrylamidopropyltrimethyl ammonium chloride), poly(acrylamide-co-N,N-dimethyl aminoethyl methacrylate), poly(acrylamide-co-N,N-dimethyl aminoethyl acrylate), poly(hydroxyethylacrylate-co-dimethyl aminoethyl methacrylate), poly(hydroxpropylacrylate-co-dimethyl aminoethyl methacrylate), poly(hydroxypropylacrylate-co-methacrylamidopropyltrimethylammonium chloride), poly(acrylamide-co-diallyldimethylammonium chloride-co-acrylic acid), poly(acrylamide-methacrylamidopropyltrimethyl ammonium chloride-co-acrylic acid). Examples of other suitable synthetic polymers are Polyquaternium-1, Polyquaternium-5, Polyquaternium-6, Polyquaternium-7, Polyquaternium-8, Polyquaternium-11, Polyquaternium-14, Polyquaternium-22, Polyquaternium-28, Polyquaternium-30, Polyquaternium-32 and Polyquaternium-33.

Other cationic polymers include polyethyleneamine and its derivatives and polyamidoamine-epichlorohydrin (PAE) Resins. In one aspect, the polyethylene derivative may be an amide derivative of polyetheylenimine sold under the trade name Lupasol SK. Also included are alkoxylated polyethlenimine; alkyl polyethyleneimine and quaternized polyethyleneimine. These polymers are described in Wet Strength resins and their applications edited by L. L. Chan, TAPPI Press (1994). The weight-average molecular weight of the polymer will generally be from about 10,000 to about 5,000,000, or from about 100,000 to about 200,000, or from about 200,000 to about 1,500,000 Daltons, as determined by size exclusion chromatography relative to polyethylene oxide standards with RI detection. The mobile phase used is a solution of 20% methanol in 0.4M MEA, 0.1 M NaNO$_3$, 3% acetic acid on a Waters Linear Ultrahdyrogel column, 2 in series. Columns and detectors are kept at 40° C. Flow is set to 0.5 mL/min.

In another aspect, the deposition aid may comprise poly (acrylamide-N-dimethyl aminoethyl acrylate) and its quaternized derivatives. In this aspect, the deposition aid may be that sold under the tradename Sedipur®, available from BTC Specialty Chemicals, a BASF Group, Florham Park, N.J. In one embodiment, the deposition aid is cationic acrylic based homopolymer sold under the tradename name Rheovis CDE, from CIBA.

Surfactants: The products of the present invention may comprise from about 0.11% to 80% by weight of a surfactant. In one aspect, such compositions may comprise from about 5% to 50% by weight of surfactant. Surfactants utilized can be of the anionic, nonionic, zwitterionic, ampholytic or cationic type or can comprise compatible mixtures of these types.

Anionic and nonionic surfactants are typically employed if the fabric care product is a laundry detergent. On the other hand, cationic surfactants are typically employed if the fabric care product is a fabric softener.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkylolammonium salts of higher fatty acids containing from about 8 to about 24 carbon atoms, or even from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Useful anionic surfactants include the water-soluble salts, particularly the alkali metal, ammonium and alkylolammonium (e.g., monoethanolammonium or triethanolammonium) salts, of organic sulfuric reaction products having in their molecular structure an alkyl group containing from about 10 to about 20 carbon atoms and a sulfonic acid or sulfuric acid ester group. (Included in the term "alkyl" is the alkyl portion of aryl groups.) Examples of this group of synthetic surfactants are the alkyl sulfates and alkyl alkoxy sulfates, especially those obtained by sulfating the higher alcohols ($C_8$-$C_{18}$ carbon atoms).

Other useful anionic surfactants herein include the water-soluble salts of esters of α-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; water-soluble salts of olefin sulfonates containing from about 12 to 24 carbon atoms; and ß-alkyloxy alkane sulfonates containing from about 1 to 3 carbon atoms in the alkyl group and from about 8 to 20 carbon atoms in the alkane moiety.

In another embodiment, the anionic surfactant may comprise a $C_{11}$-$C_{18}$ alkyl benzene sulfonate surfactant; a $C_{10}$-$C_{20}$ alkyl sulfate surfactant; a $C_{10}$-$C_{18}$ alkyl alkoxy sulfate surfactant, having an average degree of alkoxylation of from 1 to 30, wherein the alkoxy comprises a $C_1$-$C_4$ chain and mixtures thereof; a mid-chain branched alkyl sulfate surfactant; a mid-chain branched alkyl alkoxy sulfate surfactant having an average degree of alkoxylation of from 1 to 30, wherein the alkoxy comprises a $C_1$-$C_4$ chain and mixtures thereof; a $C_{10}$-$C_{18}$ alkyl alkoxy carboxylates comprising an average degree of alkoxylation of from 1 to 5; a $C_{12}$-$C_{20}$ methyl ester sulfonate surfactant, a $C_{10}$-$C_{18}$ alpha-olefin sulfonate surfactant, a $C_6$-$C_{20}$ sulfosuccinate surfactant, and a mixture thereof.

In addition to the anionic surfactant, the fabric care compositions of the present invention may further contain a nonionic surfactant. The compositions of the present invention can contain up to about 30%, alternatively from about 0.01% to about 20%, more alternatively from about 0.1% to about 10%, by weight of the composition, of a nonionic surfactant. In one embodiment, the nonionic surfactant may comprise an ethoxylated nonionic surfactant.

Suitable for use herein are the ethoxylated alcohols and ethoxylated alkyl phenols of the formula R(OC$_2$H$_4$)$_n$ OH, wherein R is selected from the group consisting of aliphatic hydrocarbon radicals containing from about 8 to about 20 carbon atoms and alkyl phenyl radicals in which the alkyl groups contain from about 8 to about 12 carbon atoms, and the average value of n is from about 5 to about 15. Materials may also be propoxylated alcohols and propoxylated alkyl phenols, and mixtures of such propoxylated and ethoxylated materials may be used. Furthermore, such materials may be propoxylated and ethoxylated.

Suitable nonionic surfactants are those of the formula R$^1$(OC$_2$H$_4$)$_n$OH, wherein R$^1$ is a $C_{10}$-$C_{16}$ alkyl group or a $C_8$-$C_{12}$ alkyl phenyl group, and n is from 3 to about 80. In one aspect, particularly useful materials are condensation products of $C_9$-$C_{15}$ alcohols with from about 5 to about 20 moles of ethylene oxide per mole of alcohol.

Additional suitable nonionic surfactants include polyhydroxy fatty acid amides such as N-methyl N-1-deoxyglucityl cocoamide and N-methyl N-1-deoxyglucityl oleamide and alkyl polysaccharides.

The fabric care compositions of the present invention may contain up to about 30%, alternatively from about 0.01% to about 20%, more alternatively from about 0.1% to about 20%, by weight of the composition, of a cationic surfactant. For the purposes of the present invention, cationic surfactants include those which can deliver fabric care benefits. Non-limiting examples of useful cationic surfactants include: fatty amines; quaternary ammonium surfactants; and imidazoline quat materials.

In some embodiments, useful cationic surfactants, have the general formula (IV):

(IV)

wherein:
(a) R$_1$ and R$_2$ each are individually selected from the groups of: $C_1$-$C_4$ alkyl; $C_1$-$C_4$ hydroxy alkyl; benzyl; —(C$_n$H$_{2n}$O)$_x$H, wherein:
  i. x has a value from about 2 to about 5;
  ii. n has a value of about 1-4;
(b) R$_3$ and R$_4$ are each:
  i. a $C_8$-$C_{22}$ alkyl; or ii. $R_3$ is a $C_8$-$C_{22}$ alkyl and $R_4$ is selected from the group of: $C_1$-$C_{10}$ alkyl; $C_1$-$C_{10}$ hydroxy alkyl; benzyl; —$(C_nH_{2n}O)_xH$, wherein:
  1. x has a value from 2 to 5; and
  2. n has a value of 1-4; and
(c) X is an anion.

The Quaternary Ammonium Ester Softening Active

The liquid fabric softener composition of the present invention may comprise a quaternary ammonium ester softening active (Fabric Softening Active, "FSA") at a level of from 3% to 25%, preferably from 4% to 18%, more preferably from 5% to 15%. Preferably, the iodine value (see Methods) of the parent fatty acid from which the quaternary ammonium fabric softening active is formed is from 25 to 50, preferably from 30 to 48, more preferably from 32 to 45. Without being bound by theory, lower melting points resulting in easier process ability of the FSA are obtained when the parent fatty acid from which the quaternary ammonium fabric softening active is formed is at least partially unsaturated. Especially double unsaturated fatty acids enable easy to process FSA's. In preferred liquid fabric softener compositions, the parent fatty acid from which the quaternary ammonium softening actives is formed comprises from 2.0% to 20.0%, preferably from 3.0% to 15.0%, more preferably from 4.0% to 15.0% of double unsaturated C18 chains ("C18:2") by weight of total fatty acid chains (see Methods). On the other hand, very high levels of unsaturated fatty acid chains are to be avoided to minimize malodor formation as a result of oxidation of the fabric softener composition over time.

In preferred liquid fabric softener compositions, the quaternary ammonium ester softening active is present at a level of from 4.0% to 18%, more preferably from 4.5% to 15%, even more preferably from 5.0% to 12% by weight of the composition. The level of quaternary ammonium ester softening active may depend of the desired concentration of total softening active in the composition (diluted or concentrated composition) and of the presence or not of other softening active. However, the risk on increasing viscosities over time is typically higher in fabric softener compositions with higher FSA levels. On the other hand, at very high FSA levels, the viscosity may no longer be sufficiently controlled which renders the product unfit for use.

Suitable quaternary ammonium ester softening actives include but are not limited to, materials selected from the group consisting of monoester quats, diester quats, triester quats and mixtures thereof. Preferably, the level of monoester quat is from 2.0% to 40.0%, the level of diester quat is from 40.0% to 98.0%, the level of triester quat is from 0.0% to 25.0% by weight of total quaternary ammonium ester softening active.

Said quaternary ammonium ester softening active may comprise compounds of the following formula:

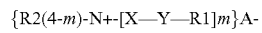
{R2(4-m)-N+-[X—Y—R1]m}A- wherein:

m is 1, 2 or 3 with proviso that the value of each m is identical;

each R1 is independently hydrocarbyl, or branched hydrocarbyl group, preferably R1 is linear, more preferably R1 is partially unsaturated linear alkyl chain;

each R2 is independently a C1-C3 alkyl or hydroxyalkyl group, preferably R2 is selected from methyl, ethyl, propyl, hydroxyethyl, 2-hydroxypropyl, 1-methyl-2 hydroxyethyl, poly(C2-C3¬ alkoxy), polyethoxy, benzyl;

each X is independently —(CH2)n-, —CH2-CH(CH3)- or —CH—(CH3)-CH2- and each n is independently 1, 2, 3 or 4, preferably each n is 2;

each Y is independently —O—(O)C— or —C(O)—O—;

A- is independently selected from the group consisting of chloride, methyl sulfate, and ethyl sulfate, preferably A- is selected from the group consisting of chloride and methyl sulfate, more preferably A is methyl sulfate;

with the proviso that when Y is —O—(O)C—, the sum of carbons in each R1 is from 13 to 21, preferably from 13 to 19. Preferably, X is —CH2-CH(CH3)- or —CH—(CH3)-CH2- to improve the hydrolytic stability of the quaternary ammonium ester softening active, and hence further improve the stability of the fabric softener composition.

Examples of suitable quaternary ammonium ester softening actives are commercially available from Evonik under the tradename Rewoquat WE18, Rewoquat WE20, from Stepan under the tradename Stepantex GA90, Stepantex VK90, Stepantex VL90A.

These types of agents and general methods of making them are disclosed in U.S. Pat. No. 4,137,180.

Fabric Care Benefit Agent

The compositions disclosed herein may include a fabric care benefit agent. As used herein, "fabric care benefit agents" refers to ingredients which are water dispersible or water insoluble and can provide fabric care benefits such as fabric softening, color protection, pill/fuzz reduction, anti-abrasion, anti-wrinkle, perfume longevity and the like, to garments and fabrics, particularly on cotton garments and fabrics.

These fabric care benefit agents typically have the solubility in distilled water of less than 100 g/L, preferably less than 10 g/L at 25° C. It is believed that if the solubility of the fabric care benefit agent is more than 10 g/L, it will remain soluble in the wash liquor and consequently will not deposit onto the fabrics.

Suitable fabric care benefit agents, include, but are not limited to, materials selected from the group consisting of non-ester quaternary ammonium compounds, amines, fatty esters, sucrose esters, silicones, dispersible polyolefins, polysaccharides, fatty acids, softening oils, polymer latexes and combinations thereof.

The fabric care benefit agents can be in the form of emulsions, latexes, dispersions, suspensions, micelles and the like, and preferably in the form of microemulsions, swollen micelles or latexes. As such, they can have a wide range of particle sizes from about 1 nm to 100 um and preferably from about 5 nm to 10 um. The particle size of the microemulsions can be determined by conventional methods, such as using a Leeds & Northrup Microtrac UPA particle sizer.

Emulsifiers, dispersing agents and suspension agents may be used. The weight ratio of emulsifiers, dispersing agents or suspension agents to the fabric care benefit agents is about 1:100 to about 1:2. Preferably, the weight ratio ranges from about 1:50 to 1:5. Any surfactants suitable for making polymer emulsions or emulsion polymerizations of polymer latexes can be used to make the water insoluble fabric care benefit agents of the present invention. Suitable surfactants include anionic, cationic, and nonionic surfactants or mixtures thereof.

Silicones

Suitable organosilicones, include, but not limited to (a) non-functionalized silicones such as polydimethylsiloxane (PDMS); and (b) functionalized silicones such as silicones with one or more functional groups selected from the group consisting of amino, amido, alkoxy, alkyl, phenyl, polyether, acrylate, siliconehydride, mercaptoproyl, carboxylate, sulfate phosphate, quaternized nitrogen, and combinations thereof.

In typical embodiments, the organosilicones suitable for use herein have a viscosity ranging from about 10 to about 2,000,000 CSt (centistokes) at 25° C. In other embodiments, the suitable organosilicones have a viscosity from about 10 to about 800,000 CSt at 25° C.

(a) Polydimethylsiloxanes (PDMS) have been described in Cosmetics and Toiletries. They can be linear, branched, cyclic, grafted or cross-linked or cyclic structures. In some embodiments, the detergent compositions comprise PDMS having a viscosity of from about 100 to about 700,000 CSt at 25° C.

(b) Exemplary functionalized silicones include but are not limited to aminosilicones, amidosilicones, silicone polyethers, alkylsilicones, phenyl silicones and quaternary silicones.

The functionalized silicones suitable for use in the present invention have the following general formula:

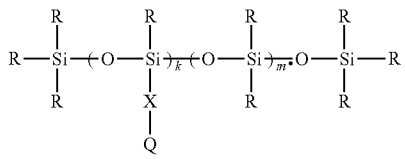

wherein
  m is from 4 to 50,000, preferably from 10 to 20,000;
  k is from 1 to 25,000, preferably from 3 to 12,000;
  each R is H or $C_1$-$C_8$ alkyl or aryl group, preferably $C_1$-$C_4$ alkyl, and more preferably a methyl group;

X is a linking group having the formula:
i) —$(CH_2)_p$— wherein p is from 2 to 6, preferably 2 to 3;
ii)

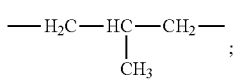

wherein q is from 0 to 4, preferably 1 to 2;
iii)

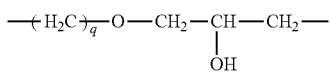

Q has the formula:
i) —$NH_2$, —NH—$(CH_2)_r$—$NH_2$, wherein r is from 1 to 4, preferably 2 to 3; or
ii) —(O—$CHR_2$—$CH_2)_s$—Z, wherein s is from 1 to 100, preferably 3 to 30;

wherein $R_2$ is H or $C_1$-$C_3$ alkyl, preferably H or $CH_3$; and Z is selected from the group consisting of —$OR_3$, —$OC(O)R_3$, —CO—$R^4$—COOH, —$SO_3$, —$PO(OH)_2$, and mixtures thereof; further wherein $R_3$ is H, $C_1$-$C_{26}$ alkyl or substituted alkyl, $C_6$-$C_{26}$ aryl or substituted aryl, $C_7$-$C_{26}$ alkylaryl or substituted alkylaryl groups, preferably $R_3$ is H, methyl, ethyl propyl or benzyl groups; $R_4$ is —$CH_2$— or —$CH_2CH_2$— groups; and
iii)

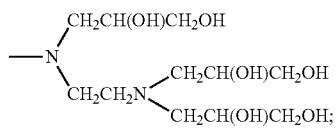

iv)

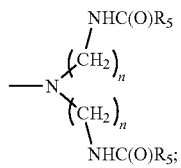

wherein n is from 1 to 4, preferably 2 to 3; and $R_5$ is C1-C4 alkyl, preferably methyl.

Another class of organosilicone useful herein is modified polyalkylene oxide polysiloxanes of the general formula:

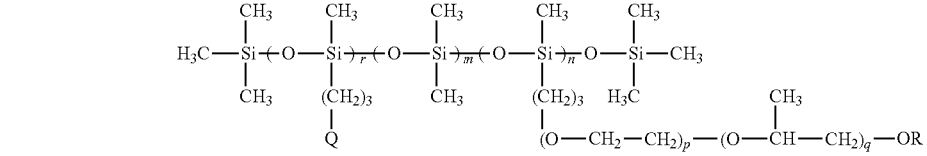

wherein Q is $NH_2$ or —$NHCH_2CH_2NH_2$; R is H or $C_1$-$C_6$ alkyl; r is from 0 to 1000; m is from 4 to 40,000; n is from 3 to 35,000; and p and q are integers independently selected from 2 to 30.

When r=0, nonlimiting examples of such polysiloxanes with polyalkylene oxide are Silwet® L-7622, Silwet® L-7602, Silwet® L-7604, Silwet® L-7500, Magnasoft® TLC, available from GE Silicones of Wilton, Conn.; Ultrasil® SW-12 and Ultrasil® DW-18 silicones, available from Noveon Inc., of Cleveland Ohio; and DC-5097, FF-400® available from Dow Corning® of Midland, Mich. Additional examples are KF-352®, KF-6015®, and KF-945®, all available from Shin Etsu Silicones of Tokyo, Japan.

When r=1 to 1000, nonlimiting examples of this class of organosilicones are Ultrasil® A21 and Ultrasil® A-23, both available from Noveon, Inc. of Cleveland, Ohio; BY16-876® from Dow Corning Toray Ltd., Japan; and X22-3939A® from Shin Etsu Corporation, Tokyo Japan.

A third class of organosilicones useful herein is modified polyalkylene oxide polysiloxanes of the general formula:

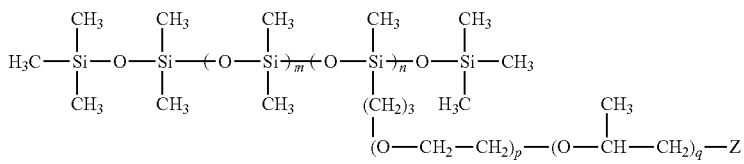

wherein m is from 4 to 40,000; n is from 3 to 35,000; and p and q are integers independently selected from 2 to 30; Z is selected from
  i.

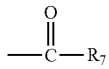

wherein $R_7$ is C1-C24 alkyl group;
  ii.

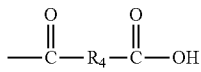

wherein $R_4$ is $CH_2$ or $CH_2CH_2$;
  iii. $-SO_3$
  iv.

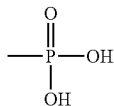

v.

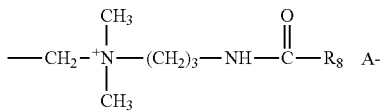

wherein $R_8$ is C1-C22 alkyl and A- is an appropriate anion, preferably Cl$^-$;
  vi.

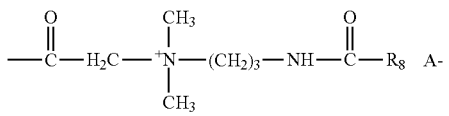

wherein $R_8$ is C1-C22 alkyl and A- is an appropriate anion, preferably Cl$^-$.

Another class of silicones is cationic silicones. These are typically produced by reacting a diamine with an epoxide. These are commercially available under the trade names Magnasoft® Prime, Magnasoft® HSSD, Silsoft® A-858 (all from GE Silicones).

In another aspect, the functionalized siloxane polymer may comprise silicone-urethanes. In one aspect, the synthesis of silicone-urethanes involves a conventional polycondensation reaction between a polysiloxane containing hydroxy functional groups or amine functional groups at the ends of its chain (for example, α, ω-dihydroxyalkylpolydimethylsiloxane or α, ω-diaminoalkylpolydimethylsiloxane or α-amino, ω-hydroxyalkylpolydimethylsiloxane) and a diisocyanate. In another aspect, organopolysiloxane oligomers containing a hydroxyalkyl functional group or an aminoalkyl functional group at the ends of its chain may be mixed with an organic diol or diamine coupling agent in a compatible solvent. The mixture may be then reacted with a diisocyanate. Silicone-urethanes are commercially available from Wacker Silicones under the trade name SLM-21200.

One embodiment of the composition of the present invention contains organosilicone emulsions, which comprise organosilicones dispersed in a suitable carrier (typically water) in the presence of an emulsifier (typically an anionic surfactant).

In another embodiment, the organosilicones are in the form of microemulsions. The organosilicone microemulsions may have an average particle size in the range from about 1 nm to about 150 nm, or from about 10 nm to about 100 nm, or from about 20 nm to about 50 nm. Microemulsions are more stable than conventional macroemulsions (average particle size about 1-20 microns) and when incorporated into a product, the resulting product has a preferred clear appearance. More importantly, when the composition is used in a typical aqueous wash environment, the emulsifiers in the composition become diluted such that the microemulsions can no longer be maintained and the organosilicones coalesce to form significantly larger droplets which have an average particle size of greater than about 1 micron. Since the selected organosilicones are water insoluble or have limited solubility in water, they will crash out of the wash liquor, resulting in more efficient deposition onto the fabrics and enhanced fabric care benefits. In a typical immersive wash environment, the composition is mixed with an excess of water to form a wash liquor, which typically has a weight ratio of water:composition ranging from 10:1 to 400:1.

A typical embodiment of the composition comprising from about 0.01% to about 10%, by weight of composition of the organosilicones and an effective amount of an emulsifier in a carrier. The "effective amount" of emulsifier is the amount sufficient to produce an organosilicone microemulsion in the carrier, preferably water. In some embodiments, the amount of emulsifiers ranges from about 5 to about 75 parts, or from about 25 to about 60 parts per 100 weight parts organosilicone.

The microemulsion typically comprises from about 10 to about 70%, or from about 25 to about 60%, by weight of the microemulsion of the dispersed organosilicones; from about 0.1 to about 30%, or from about 1 to about 20%, by weight of the microemulsion of anionic surfactant; optionally, from about 0 to about 3%, or from about 0.1 to about 20%, by weight of the microemulsion of nonionic surfactant; and the balance being water, and optionally other carriers. Selected organosilicone polymers (all those disclosed herein above, excluding PDMS and cationic silicones) are suitable for forming microemulsions; these organosilicones are sometimes referred to as the "self emulsifying silicones". Emulsifiers, particularly anionic surfactants, may be added to aid the formation of organosilicone microemulsions in the composition. Optionally, nonionic surfactants useful as laundry adjuncts to provide detersive benefits can also aid the formation and stability of the microemulsions. In a typical embodiment, the amount of emulsifiers is from about 0.05% to about 15% by weight of the composition.

Non-Ester Quaternary Ammonium Compounds:
Suitable non-ester quaternary ammonium compounds comprise compounds of the formula:

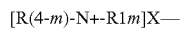
[R(4-m)-N+-R1m]X— wherein each R comprises either hydrogen, a short chain C1-C6, in one aspect a C1-C3 alkyl or hydroxyalkyl group, for example methyl, ethyl, propyl, hydroxyethyl, poly(C2-3¬ alkoxy), polyethoxy, benzyl, or mixtures thereof; each m is 1, 2 or 3 with the proviso that the value of each m is the same; the sum of carbons in each R1 may be C12-C22, with each R1 being a hydrocarbyl, or substituted hydrocarbyl group; and X— may comprise any softener-compatible anion. The softener-compatible anion may comprise chloride, bromide, methylsulfate, ethylsulfate, sulfate, and nitrate. The softener-compatible anion may comprise chloride or methyl sulfate.

Non-limiting examples include dialkylenedimethylammonium salts such as dicanoladimethylammonium chloride, di(hard)tallowdimethylammonium chloride dicanoladimethylammonium methylsulfate, and mixtures thereof. An example of commercially available dialkylenedimethylammonium salts usable in the present invention is dioleyldimethylammonium chloride available from Witco Corporation under the trade name Adogen® 472 and dihardtallow dimethylammonium chloride available from Akzo Nobel Arquad 2HT75.

Amines:
Suitable amines include but are not limited to, materials selected from the group consisting of amidoesteramines, amidoamines, imidazoline amines, alkyl amines, and combinations thereof. Suitable ester amines include but are not limited to, materials selected from the group consisting of monoester amines, diester amines, triester amines and combinations thereof. Suitable amidoamines include but are not limited to, materials selected from the group consisting of monoamido amines, diamido amines and combinations thereof. Suitable alkyl amines include but are not limited to, materials selected from the group consisting of mono alkylamines, dialkyl amines quats, trialkyl amines, and combinations thereof.

Fatty Acid:
The liquid fabric softener composition may comprise a fatty acid, such as a free fatty acid as fabric softening active. The term "fatty acid" is used herein in the broadest sense to include unprotonated or protonated forms of a fatty acid. One skilled in the art will readily appreciate that the pH of an aqueous composition will dictate, in part, whether a fatty acid is protonated or unprotonated. The fatty acid may be in its unprotonated, or salt form, together with a counter ion, such as, but not limited to, calcium, magnesium, sodium, potassium, and the like. The term "free fatty acid" means a fatty acid that is not bound to another chemical moiety (covalently or otherwise).

The fatty acid may include those containing from 12 to 25, from 13 to 22, or even from 16 to 20, total carbon atoms, with the fatty moiety containing from 10 to 22, from 12 to 18, or even from 14 (mid-cut) to 18 carbon atoms.

The fatty acids may be derived from (1) an animal fat, and/or a partially hydrogenated animal fat, such as beef tallow, lard, etc.; (2) a vegetable oil, and/or a partially hydrogenated vegetable oil such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, castor oil, etc.; (3) processed and/or bodied oils, such as linseed oil or tung oil via thermal, pressure, alkali-isomerization and catalytic treatments; (4) combinations thereof, to yield saturated (e.g. stearic acid), unsaturated (e.g. oleic acid), polyunsaturated (linoleic acid), branched (e.g. isostearic acid) or cyclic (e.g. saturated or unsaturated disubstituted cyclopentyl or cyclohexyl derivatives of polyunsaturated acids) fatty acids.

Mixtures of fatty acids from different fat sources can be used.

The cis/trans ratio for the unsaturated fatty acids may be important, with the cis/trans ratio (of the C18:1 material) being from at least 1:1, at least 3:1, from 4:1 or even from 9:1 or higher.

Branched fatty acids such as isostearic acid are also suitable since they may be more stable with respect to oxidation and the resulting degradation of color and odor quality.

The fatty acid may have an iodine value from 0 to 140, from 50 to 120 or even from 85 to 105.

Polysaccharides:
The liquid fabric softener composition may comprise a polysaccharide as a fabric softening active, such as cationic starch. Suitable cationic starches for use in the present compositions are commercially available from Cerestar under the trade name C*BOND® and from National Starch and Chemical Company under the trade name CATO® 2A.

Sucrose Esters:
The liquid fabric softener composition may comprise a sucrose esters as a fabric softening active. Sucrose esters are typically derived from sucrose and fatty acids. Sucrose ester is composed of a sucrose moiety having one or more of its hydroxyl groups esterified. Sucrose is a disaccharide. The sucrose molecule can be represented by the formula: M(OH) 8, wherein M is the disaccharide backbone and there are total of 8 hydroxyl groups in the molecule.

Thus, sucrose esters can be represented by the following formula:

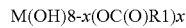
M(OH)8-x(OC(O)R1)x wherein x is the number of hydroxyl groups that are esterified, whereas (8-x) is the hydroxyl groups that remain unchanged; x is an integer selected from 1 to 8, alternatively from 2 to 8, alternatively from 3 to 8, or from 4 to 8; and R1 moieties are independently selected from C1-C22 alkyl or C1-C30 alkoxy, linear or branched, cyclic or acyclic, saturated or unsaturated, substituted or unsubstituted.

The R1 moieties may comprise linear alkyl or alkoxy moieties having independently selected and varying chain length. For example, R1 may comprise a mixture of linear alkyl or alkoxy moieties wherein greater than 20% of the linear chains are C18, alternatively greater than 50% of the linear chains are C18, alternatively greater than 80% of the linear chains are C18.

The R1 moieties may comprise a mixture of saturate and unsaturated alkyl or alkoxy moieties. The iodine value of the sucrose esters suitable for use herein ranges from 1 to 150, or from 2 to 100, or from 5 to 85. The R1 moieties may be hydrogenated to reduce the degree of unsaturation. In the case where a higher iodine value is preferred, such as from 40 to 95, then oleic acid and fatty acids derived from soybean oil and canola oil are suitable starting materials.

The unsaturated R1 moieties may comprise a mixture of "cis" and "trans" forms the unsaturated sites. The "cis"/ "trans" ratios may range from 1:1 to 50:1, or from 2:1 to 40:1, or from 3:1 to 30:1, or from 4:1 to 20:1.

Dispersible Polyolefins and Latexes:

Generally, all dispersible polyolefins that provide fabric softening benefits can be used as fabric softening active in the present invention. The polyolefins can be in the form of waxes, emulsions, dispersions or suspensions.

The polyolefin may be chosen from a polyethylene, polypropylene, or combinations thereof. The polyolefin may be at least partially modified to contain various functional groups, such as carboxyl, alkylamide, sulfonic acid or amide groups. The polyolefin may be at least partially carboxyl modified or, in other words, oxidized.

Non-limiting examples of fabric softening active include dispersible polyethylene and polymer latexes. These agents can be in the form of emulsions, latexes, dispersions, suspensions, and the like. In one aspect, they are in the form of an emulsion or a latex. Dispersible polyethylenes and polymer latexes can have a wide range of particle size diameters ($\chi 50$) including but not limited to from 1 nm to 100 μm; alternatively, from 10 nm to 10 μm. As such, the particle sizes of dispersible polyethylenes and polymer latexes are generally, but without limitation, smaller than silicones or other fatty oils.

Generally, any surfactant suitable for making polymer emulsions or emulsion polymerizations of polymer latexes can be used as emulsifiers for polymer emulsions and latexes used as fabric softeners active in the present invention. Suitable surfactants include anionic, cationic, and non-ionic surfactants, and combinations thereof. In one aspect, such surfactants are non-ionic and/or anionic surfactants. In one aspect, the ratio of surfactant to polymer in the fabric softening active is 1:5, respectively.

Anionic Surfactant Scavenger

The composition may contain an anionic surfactant scavenger. The surfactant scavenger is preferably a water soluble cationic and/or zwitterionic scavenger compound. The cationic and zwitterionic scavenger compounds useful herein typically have a quaternized nitrogen atom or amine group. Suitable anionic surfactant scavengers, include, but not limited to monoalkyl quaternary ammonium compounds and amine precursors thereof, dialkyl quaternary ammonium compounds and amine precursors thereof, polymeric amines, polyquaternary ammonium compounds and amine precursors thereof.

Dispersants—The compositions may contain from about 0.1%, to about 10%, by weight of dispersants. Suitable water-soluble organic materials are the homo- or co-polymeric acids or their salts, in which the polycarboxylic acid may contain at least two carboxyl radicals separated from each other by not more than two carbon atoms. The dispersants may also be alkoxylated derivatives of polyamines, and/or quaternized derivatives.

Dye Transfer Inhibiting Agents—The compositions may also include from about 0.0001%, from about 0.01%, from about 0.05% by weight of the compositions to about 10%, about 2%, or even about 1% by weight of the compositions of one or more dye transfer inhibiting agents such as polyvinylpyrrolidone polymers, polyamine N-oxide polymers, copolymers of N-vinylpyrrolidone and N-vinylimidazole, polyvinyloxazolidones and polyvinylimidazoles or mixtures thereof.

Chelant—The compositions may contain less than about 5%, or from about 0.01% to about 3% of a chelant such as citrates; nitrogen-containing, P-free aminocarboxylates such as EDDS, EDTA and DTPA; aminophosphonates such as diethylenetriamine pentamethylenephosphonic acid and, ethylenediamine tetramethylenephosphonic acid; nitrogen-free phosphonates e.g., HEDP; and nitrogen or oxygen containing, P-free carboxylate-free chelants such as compounds of the general class of certain macrocyclic N-ligands such as those known for use in bleach catalyst systems.

Brighteners—The compositions may also comprise a brightener (also referred to as "optical brightener") and may include any compound that exhibits fluorescence, including compounds that absorb UV light and reemit as "blue" visible light. Non-limiting examples of useful brighteners include: derivatives of stilbene or 4,4'-diaminostilbene, biphenyl, five-membered heterocycles such as triazoles, pyrazolines, oxazoles, imidiazoles, etc., or six-membered heterocycles (coumarins, naphthalamide, s-triazine, etc.). Cationic, anionic, nonionic, amphoteric and zwitterionic brighteners can be used. Suitable brighteners include those commercially marketed under the trade name Tinopal-UNPA-GX® by Ciba Specialty Chemicals Corporation (High Point, N.C.).

Structurant—The compositions may contain one or more structurant and thickener. Any suitable level of structurant may be of use; exemplary levels include from about 0.01% to about 20%, from about 0.1% to about 10%, or from about 0.1% to about 3% by weight of the composition. Non-limiting examples of structurants suitable for use herein include crystalline, hydroxyl-containing stabilizing agents, trihydroxystearin, hydrogenated oil, or a variation thereof, and combinations thereof. Other structurants include thickening structurants such as gums and other similar polysaccharides, for example gellan gum, carrageenan gum, and other known types of thickeners and rheological additives. Exemplary structurants in this class include gum-type polymers (e.g. xanthan gum), polyvinyl alcohol and derivatives thereof, cellulose and derivatives thereof including cellulose ethers and cellulose esters and tamarind gum (for example, comprising xyloglucan polymers), guar gum, locust bean gum (in some aspects comprising galactomannan polymers), and other industrial gums and polymers.

Structurants may also include homo- and co-polymers comprising cationic monomers selected from the group consisting of N,N-dialkylaminoalkyl methacrylate, N,N-dialkylaminoalkyl methyl methacrylate, N,N-dialkylaminoalkyl acrylate, N,N-dialkylaminoalkyl acrylamide, N,N-dialkylaminoalkylmethacrylamide, quaternized N,N-dialkylaminoalkyl methacrylate, quaternized N,N-dialkylaminoalkyl methyl methacrylate, quaternized N,N-dialkylaminoalkyl acrylate, quaternized N,N-dialkylaminoalkyl acrylamide, quaternized N,N-dialkylaminoalkylmethacrylamide.

Perfume: The optional perfume component may comprise a component selected from the group consisting of
(1) a perfume capsule, or a moisture-activated perfume capsule, comprising a perfume carrier and an encapsulated perfume composition, wherein said perfume carrier may be selected from the group consisting of cyclodextrins, starch capsules, porous carrier capsules, and mixtures thereof; and wherein said encapsulated perfume composition may comprise low volatile perfume ingredients, high volatile perfume ingredients, and mixtures thereof;

(2) a pro-perfume;

(3) a low odor detection threshold perfume ingredients, wherein said low odor detection threshold perfume ingredients may comprise less than about 25%, by weight of the total neat perfume composition; and (4) mixtures thereof; and Porous Carrier Capsule—A portion of the perfume composition can also be absorbed onto and/or into a porous carrier, such as zeolites or clays, to form perfume porous carrier capsules in order to reduce the amount of free perfume in the multiple use fabric conditioning composition.

Pro-Perfume—The perfume composition may additionally include a pro-perfume. Pro-perfumes may comprise nonvolatile materials that release or convert to a perfume material as a result of, e.g., simple hydrolysis, or may be pH-change-triggered pro-perfumes (e.g. triggered by a pH drop) or may be enzymatically releasable pro-perfumes, or light-triggered pro-perfumes. The pro-perfumes may exhibit varying release rates depending upon the pro-perfume chosen.

Perfume Delivery Systems

As disclosed, the benefits of the perfumes disclosed herein may be further enhanced by employing a perfume delivery system to apply such perfumes. Non-limiting examples of suitable perfume delivery systems, methods of making perfume delivery systems and the uses of such perfume delivery systems are disclosed in USPA 2007/0275866 A1. Such perfume delivery systems include:

Polymer Assisted Delivery (PAD): This perfume delivery technology uses polymeric materials to deliver perfume materials. Classical coacervation, water soluble or partly soluble to insoluble charged or neutral polymers, liquid crystals, hot melts, hydrogels, perfumed plastics, capsules, nano- and micro-latexes, polymeric film formers, and polymeric absorbents, polymeric adsorbents, etc. are some examples. PAD includes but is not limited to:

Matrix Systems: The fragrance is dissolved or dispersed in a polymer matrix or particle. Perfumes, for example, may be 1) dispersed into the polymer prior to formulating into the product or 2) added separately from the polymer during or after formulation of the product. Diffusion of perfume from the polymer is a common trigger that allows or increases the rate of perfume release from a polymeric matrix system that is deposited or applied to the desired surface (situs), although many other triggers are known that may control perfume release. Absorption and/or adsorption into or onto polymeric particles, films, solutions, and the like are aspects of this technology. Nano- or micro-particles composed of organic materials (e.g., latexes) are examples. Suitable particles include a wide range of materials including, but not limited to polyacetal, polyacrylate, polyacrylic, polyacrylonitrile, polyamide, polyaryletherketone, polybutadiene, polybutylene, polybutylene terephthalate, polychloroprene, polyethylene, polyethylene terephthalate, polycyclohexylene dimethylene terephthalate, polycarbonate, polychloroprene, polyhydroxyalkanoate, polyketone, polyester, polyetherimide, polyethersulfone, polyethylenechlorinates, polyimide, polyisoprene, polylactic acid, polymethylpentene, polyphenylene oxide, polyphenylene sulfide, polyphthalamide, polypropylene, polystyrene, polysulfone, polyvinyl acetate, polyvinyl chloride, as well as polymers or copolymers based on acrylonitrile-butadiene, cellulose acetate, ethylene-vinyl acetate, ethylene vinyl alcohol, styrene-butadiene, vinyl acetate-ethylene, and mixtures thereof.

Silicones are also examples of polymers that may be used as PDT, and can provide perfume benefits in a manner similar to the polymer-assisted delivery "matrix system". Such a PDT is referred to as silicone-assisted delivery (SAD). One may pre-load silicones with perfume, or use them as an equilibrium system as described for PAD. Examples of silicones include polydimethylsiloxane and polyalkyldimethylsiloxanes. Other examples include those with amine functionality, which may be used to provide benefits associated with amine-assisted delivery (AAD) and/or polymer-assisted delivery (PAD) and/or amine-reaction products (ARP).

Reservoir Systems: Reservoir systems are also known as a core-shell type technology, or one in which the fragrance is surrounded by a perfume release controlling membrane, which may serve as a protective shell. The material inside the capsule is referred to as the core, internal phase, or fill, whereas the wall is sometimes called a shell, coating, or membrane. Microparticles or pressure sensitive capsules or capsules are examples of this technology. Capsules of the current invention are formed by a variety of procedures that include, but are not limited to, coating, extrusion, spray-drying, interfacial, in-situ and matrix polymerization. The possible shell materials vary widely in their stability toward water. Among the most stable are polyoxymethyleneurea (PMU)-based materials, which may hold certain PRMs for even long periods of time in aqueous solution (or product). Such systems include but are not limited to urea-formaldehyde and/or melamine-formaldehyde. Gelatin-based capsules may be prepared so that they dissolve quickly or slowly in water, depending for example on the degree of cross-linking. Many other capsule wall materials are available and vary in the degree of perfume diffusion stability observed. Without wishing to be bound by theory, the rate of release of perfume from a capsule, for example, once deposited on a surface is typically in reverse order of in-product perfume diffusion stability. As such, urea-formaldehyde and melamine-formaldehyde capsules for example, typically require a release mechanism other than, or in addition to, diffusion for release, such as mechanical force (e.g., friction, pressure, shear stress) that serves to break the capsule and increase the rate of perfume (fragrance) release. Other triggers include melting, dissolution, hydrolysis or other chemical reaction, electromagnetic radiation, and the like. The use of pre-loaded capsules requires the proper ratio of in-product stability and in-use and/or on-surface (on-situs) release, as well as proper selection of PRMs. Capsules that are based on urea-formaldehyde and/or melamine-formaldehyde are relatively stable, especially in near neutral aqueous-based solutions. These materials may require a friction trigger which may not be applicable to all product applications. Other capsule materials (e.g., gelatin) may be unstable in aqueous-based products and may even provide reduced benefit (versus free perfume control) when in-product aged. Scratch and sniff technologies are yet another example of PAD.

In one aspect, the capsule wall material may comprise: melamine, polyacrylamide, silicones, silica, polystyrene, polyurea, polyurethanes, polyacrylate based materials, gelatin, styrene malic anhydride, polyamides, and mixtures thereof. In one aspect, said melamine wall material may comprise melamine crosslinked with formaldehyde, melamine-dimethoxyethanol crosslinked with formaldehyde, and mixtures thereof. In one aspect, said polystyrene wall material may comprise polyestyrene cross-linked with divinylbenzene. In one aspect, said polyurea wall material may comprise urea crosslinked with formaldehyde, urea crosslinked with gluteraldehyde, and mixtures thereof. In one aspect, said polyacrylate based materials may comprise polyacrylate formed from methylmethacrylate/dimethylaminomethyl methacrylate, polyacrylate formed from amine acrylate and/or methacrylate and strong acid, polyacrylate formed from carboxylic acid acrylate and/or methacrylate monomer and strong base, polyacrylate formed from an amine acrylate and/or methacrylate monomer and a carboxylic acid acrylate and/or carboxylic acid methacrylate monomer, and mixtures thereof. In one aspect, the encapsulated perfume may be coated with a deposition aid, a cationic polymer, a non-ionic polymer, an anionic polymer, or mixtures thereof. Suitable polymers may be selected from the group consisting of: polyvinylformaldehyde, partially hydroxylated polyvinylformaldehyde, polyvinylamine, polyethyleneimine, ethoxylated polyethyleneimine, polyvinylalcohol, polyacrylates, and combinations thereof. In one aspect, one or more types of encapsulated perfumes, for example two types of encapsulated perfumes each having a different benefit agent, and/or processing parameters may be used.

Molecule-Assisted Delivery (MAD): Non-polymer materials or molecules may also serve to improve the delivery of perfume. Without wishing to be bound by theory, perfume may non-covalently interact with organic materials, resulting in altered deposition and/or release. Non-limiting examples of such organic materials include but are not limited to hydrophobic materials such as organic oils, waxes, mineral oils, petrolatum, fatty acids or esters, sugars, surfactants, liposomes and even other perfume raw material (perfume oils), as well as natural oils, including body and/or other soils. Perfume fixatives are yet another example. In one aspect, non-polymeric materials or molecules have a C Log P greater than about 2.

Cyclodextrin (CD): This technology approach uses a cyclic oligosaccharide or cyclodextrin to improve the delivery of perfume. Typically, a perfume and cyclodextrin (CD) complex is formed. Such complexes may be preformed, formed in-situ, or formed on or in the situs. Without wishing to be bound by theory, loss of water may serve to shift the equilibrium toward the CD-Perfume complex, especially if other adjunct ingredients (e.g., surfactant) are not present at high concentration to compete with the perfume for the cyclodextrin cavity. A bloom benefit may be achieved if water exposure or an increase in moisture content occurs at a later time point. In addition, cyclodextrin allows the perfume formulator increased flexibility in selection of PRMs. Cyclodextrin may be pre-loaded with perfume or added separately from perfume to obtain the desired perfume stability, deposition or release benefit.

Starch Encapsulated Accord (SEA): The use of a starch encapsulated accord (SEA) technology allows one to modify the properties of the perfume, for example, by converting a liquid perfume into a solid by adding ingredients such as starch. The benefit includes increased perfume retention during product storage, especially under non-aqueous conditions. Upon exposure to moisture, a perfume bloom may be triggered. Benefits at other moments of truth may also be achieved because the starch allows the product formulator to select PRMs or PRM concentrations that normally cannot be used without the presence of SEA. Another technology example includes the use of other organic and inorganic materials, such as silica to convert perfume from liquid to solid.

Zeolite & Inorganic Carrier (ZIC): This technology relates to the use of porous zeolites or other inorganic materials to deliver perfumes. Perfume-loaded zeolite may be used with or without adjunct ingredients used for example to coat the perfume-loaded zeolite (PLZ) to change its perfume release properties during product storage or during use or from the dry situs. Silica is another form of ZIC. Another example of a suitable inorganic carrier includes inorganic tubules, where the perfume or other active material is contained within the lumen of the nano- or micro-tubules. Preferably, the perfume-loaded inorganic tubule (or Perfume-Loaded Tubule or PLT) is a mineral nano- or micro-tubule, such as halloysite or mixtures of halloysite with other inorganic materials, including other clays. The PLT technology may also comprise additional ingredients on the inside and/or outside of the tubule for the purpose of improving in-product diffusion stability, deposition on the desired situs or for controlling the release rate of the loaded perfume. Monomeric and/or polymeric materials, including starch encapsulation, may be used to coat, plug, cap, or otherwise encapsulate the PLT.

Fabric Hueing Agents—The composition may comprise a fabric hueing agent (sometimes referred to as shading, bluing or whitening agents). Typically, the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Suitable fabric hueing agents include dyes, dye-clay conjugates, and organic and inorganic pigments. Suitable dyes include small molecule dyes and polymeric dyes. Suitable small molecule dyes include small molecule dyes selected from the group consisting of dyes falling into the Colour Index (C.I.) classifications of Acid, Direct, Basic, Reactive or hydrolysed Reactive, Solvent or Disperse dyes for example that are classified as Blue, Violet, Red, Green or Black, and provide the desired shade either alone or in combination. In another aspect, suitable small molecule dyes include small molecule dyes selected from the group consisting of Colour Index (Society of Dyers and Colourists, Bradford, UK) numbers Direct Violet dyes such as 9, 35, 48, 51, 66, and 99, Direct Blue dyes such as 1, 71, 80 and 279, Acid Red dyes such as 17, 73, 52, 88 and 150, Acid Violet dyes such as 15, 17, 24, 43, 49 and 50, Acid Blue dyes such as 15, 17, 25, 29, 40, 45, 75, 80, 83, 90 and 113, Acid Black dyes such as 1, Basic Violet dyes such as 1, 3, 4, 10 19, 35, 38, and 48, Basic Blue dyes such as 3, 16, 22, 47, 65, 66, 67, 71, 75 and 159, Disperse or Solvent dyes, and mixtures thereof. In another aspect, suitable small molecule dyes include small molecule dyes selected from the group consisting of C. I. numbers Acid Violet 17, Acid Blue 80, Acid Violet 50, Direct Blue 71, Direct Violet 51, Direct Blue 1, Acid Red 88, Acid Red 150, Acid Blue 29, Acid Blue 113 or mixtures thereof.

Polymeric Dyes—Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof.

In another aspect, suitable polymeric dyes include polymeric dyes selected from the group consisting of fabric-substantive colorants sold under the name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® Violet CT, carboxymethyl cellulose (CMC) covalently bound to a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

The aforementioned fabric hueing agents can be used in combination (any mixture of fabric hueing agents can be used).

Coatings—In one aspect of the invention, perfume capsules are manufactured and are subsequently coated with an additional material. Non-limiting examples of coating materials include but are not limited to materials selected from the group consisting of poly(meth)acrylate, poly(ethylene-maleic anhydride), polyamine, wax, polyvinylpyrrolidone, polyvinylpyrrolidone co-polymers, polyvinylpyrrolidone-ethyl acrylate, polyvinylpyrrolidone-vinyl acrylate, polyvinylpyrrolidone methylacrylate, polyvinylpyrrolidone/vinyl acetate, polyvinyl acetal, polyvinyl butyral, polysiloxane, poly(propylene maleic anhydride), maleic anhydride derivatives, co-polymers of maleic anhydride derivatives, polyvinyl alcohol, styrene-butadiene latex, gelatin, gum Arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, poly(vinyl pyrrolidone/methacrylamidopropyl trimethyl ammonium chloride), polyvinylpyrrolidone/vinyl acetate, polyvinyl pyrrolidone/dimethylaminoethyl methacrylate, polyvinyl amines, polyvinyl formamides, polyallyl amines and copolymers of polyvinyl amines, polyvinyl formamides, and polyallyl amines and mixtures thereof. Such materials can be obtained from CP Kelco Corp. of San Diego, Calif., USA; Degussa AG or Dusseldorf, Germany; BASF AG of Ludwigshafen, Germany; Rhodia Corp. of Cranbury, N.J., USA; Baker Hughes Corp. of Houston, Tex., USA; Hercules Corp. of Wilmington, Del., USA; Agrium Inc. of Calgary, Alberta, Canada, ISP of New Jersey U.S.A.

Formaldehyde Scavenger—In one aspect perfume particles may be combined with a formaldehyde scavenger. In one aspect, such perfume capsules may comprise the perfume capsules of the present invention. Suitable formaldehyde scavengers include materials selected from the group consisting of sodium bisulfite, melamine, urea, ethylene urea, cysteine, cysteamine, lysine, glycine, serine, carnosine, histidine, glutathione, 3,4-diaminobenzoic acid, allantoin, glycouril, anthranilic acid, methyl anthranilate, methyl 4-aminobenzoate, ethyl acetoacetate, acetoacetamide, malonamide, ascorbic acid, 1,3-dihydroxyacetone dimer, biuret, oxamide, benzoguanamine, pyroglutamic acid, pyrogallol, methyl gallate, ethyl gallate, propyl gallate, triethanol amine, succinamide, thiabendazole, benzotriazol, triazole, indoline, sulfanilic acid, oxamide, sorbitol, glucose, cellulose, poly(vinyl alcohol), partially hydrolyzed poly(vinylformamide), poly(vinyl amine), poly(ethylene imine), poly (oxyalkyleneamine), poly(vinyl alcohol)-co-poly(vinyl amine), poly(4-aminostyrene), poly(1-lysine), chitosan, hexane diol, ethylenediamine-N,N'-bisacetoacetamide, N-(2-ethylhexyl)acetoacetamide, 2-benzoylacetoacetamide, N-(3-phenylpropyl)acetoacetamide, lilial, helional, melonal, triplal, 5,5-dimethyl-1,3-cyclohexanedione, 2,4-dimethyl-3-cyclohexenecarboxaldehyde, 2,2-dimethyl-1,3-dioxan-4,6-dione, 2-pentanone, dibutyl amine, triethylenetetramine, ammonium hydroxide, benzylamine, hydroxycitronellol, cyclohexanone, 2-butanone, pentane dione, dehydroacetic acid, or a mixture thereof. These formaldehyde scavengers may be obtained from Sigma/Aldrich/Fluka of St. Louis, Mo. U.S.A. or PolySciences, Inc. of Warrington, Pa., U.S.A.

Carrier—The compositions generally contain a carrier. In some aspects, the carrier may be water alone or mixtures of organic solvents with water. In some aspects, organic solvents include 1,2-propanediol, ethanol, isopropanol, glycerol and mixtures thereof. Other lower alcohols, $C_1$-$C_4$ alkanolamines such as monoethanolamine and triethanolamine, can also be used. Suitable carriers include, but are not limited to, salts, sugars, polyvinyl alcohols (PVA), modified PVAs; polyvinyl pyrrolidone.

Method of Use and Treated Article

Compositions disclosed herein can be used to clean and/or treat a fabric. Typically at least a portion of the fabric is contacted with an embodiment of Applicants' composition, in neat form or diluted in a liquor, for example, a wash liquor and then the fabric may be optionally washed and/or rinsed For purposes of the present invention, washing includes but is not limited to, scrubbing, and mechanical agitation. The fabric may comprise most any fabric capable of being laundered or treated in normal consumer use conditions. Wash liquors that may comprise the disclosed compositions may have a pH of from about 3 to about 12. Such compositions are typically employed at concentrations of from about 500 ppm to about 15,000 ppm in the wash liquor or at a concentration that otherwise provides from about 50 ppm to about 350 ppm of softener active in the wash liquor. When the wash solvent is water, the water temperature typically ranges from about 5° C. to about 90° C. and, when the fabric comprises a fabric, the water to fabric ratio is typically from about 1:1 to about 30:1.

A fabric treated with a liquid fabric enhancer according to any of Paragraphs A) through M) is disclosed.

A method of softening a fabric, said method comprising
(i) optionally washing and/or rinsing said fabric;
(ii) contacting said fabric with a liquid fabric enhancer according to Paragraphs A) through M);
(iii) optionally washing and/or rinsing said fabric; and
(iii) optionally passively or actively drying said fabric is disclosed.

The use of the fabric enhancer according to any of Paragraphs A) through M) to soften a fabric, is disclosed.

Test Methods

Molecular Weight Distribution

Weight-average molecular weight ($M_w$) values were determined as follows. Sample molecular weights were determined on an Agilent 1260 HPLC system equipped with autosampler, column oven, and refractive index detector. The operating system was OpenLAB CDS ChemStation Workstation (A.01.03). Data storage and analysis were performed with Cirrus GPC offline, GPC/SEC Software for ChemStation, version 3.4. Chromatographic conditions are given in Table 3. In carrying out the calculation, the results were calibrated using polystyrene reference samples having known molecular weights. Measurements of $M_w$ values vary by 5% or less. The molecular weight analyses were determined using a chloroform mobile phase.

TABLE 3

| Parameter | Conditions |
|---|---|
| Column Set | Three ResiPore columns (Agilent #1113-6300) in series with guard column (Agilent #1113-1300) Particle size: 3 μm Column dimensions: 300 × 7.5 mm |
| Mobile Phase | Chloroform |
| Flow Rate | 1 mL/min, needle wash is included |
| Column Temperature | 40° C. |
| Injection Volume | 20 μL |
| Detector | Refractive Index |
| Detector Temperature | 40° C. |

Table 4 shows the molecular weights and the retention times of the polystyrene standards.

TABLE 4

| Standard Number | Average Reported MW | Retention Time (min) |
|---|---|---|
| 1 | 150,000 | 19.11 |
| 2 | 100,000 | 19.63 |
| 3 | 70,000 | 20.43 |
| 4 | 50,000 | 20.79 |
| 5 | 30,000 | 21.76 |
| 6 | 9,000 | 23.27 |
| 7 | 5,000 | 23.86 |
| 8 | 1,000 | 27.20 |
| 9 | 500 | 28.48 |

Iodine Value

Another aspect of the invention provides a method to measure the iodine value of the branched polyester polymer. The iodine value is determined using AOCS Official Method Cd 1-25 with the following modifications: carbon tetrachloride solvent is replaced with chloroform (25 ml), an accuracy check sample (oleic acid 99%, Sigma-Aldrich; IV=89.86±2.00 cg/g) is added to the sample set, and the reported IV is corrected for minor contribution from olefins identified when
Softness Testing Performance of Fabric Softener
To evaluate the efficacy of a fabric softener composition for delivering a fabric softening benefit, North America Kenmore 80 Series top-loading washing machines were used. Each machine was set to run a Normal single cycle including a 12 minute wash agitation period, and 1 three-minute rinse. The water used was 137 ppm hardness and 25° C. for the wash, and 15.5° C. for the rinse. The water volume at each step was 64 Liters. The total fabric load weight was 3.6 kg (which includes 10 test fabric hand towel terry cloths, and the remaining ballast consisting of half cotton fabric only and half 50/50 poly-cotton blend). The detergent used was TIDE ORIGINAL SCENT liquid detergent (produced by The Procter & Gamble Company). 84.3 g of detergent was dosed into the wash water while the wash water was filling. This was followed by the wash agitation (Normal setting), and the rinse step (with corresponding spin cycle). Fabric softener composition was added into the rinse cycle as the rinse water was ⅔ filled, dosed at 48.5 g. For the Reference product, fabrics were washed using the same procedure with DOWNY fabric softener, available from the Procter and Gamble Company. It was used at 48.5 g.
After the wash process was completed, the fabrics were removed. The test fabrics were machine dried in Kenmore dryers on Cotton/High setting, for 50 minutes. The steps of washing and drying were repeated two more times. After the third wash and dry cycle, the test fabrics were equilibrated for 24 hours in a 70 F/50% Relative Humidity controlled room. After the test fabric terry cloths had equilibrated, the kinematic coefficient of friction of each terry was evaluated using a Thwing Albert Friction/Peel Tester FP-2250 by attaching a swatch cut from the terry cloth to a sled and dragging the sled over a portion of the remaining terry cloth at a fixed rate. The kinematic coefficient of friction data reported were all measured using the same method and instrumentation. The average for the 10 terry cloths washed in the respective product are reported.

EXAMPLES

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

Examples 1

Liquid Fabric Enhancer

Liquid Fabric Enhancers are prepared by mixing together ingredients shown below:

| | EXAMPLE COMPOSITION | |
|---|---|---|
| | 1A | 1B |
| Fabric Softener Active[1] | 8.5 | 10.7 |
| Quaternized polyacrylamide[2] | 0.135 | 0.135 |
| Polyester Polymer 1[3] | 4.4 | 2.2 |
| Water soluble dialkyl quat[4] | 0.2 | 0.2 |
| Water, emulsifiers, perfume, suds suppressor, stabilizers, preservative, antioxidant, chelant, pH control agents, buffers, dyes & other optional ingredients | q.s. to 100% pH = 3.0 | q.s. to 100% pH = 3.0 |

The liquid fabric enhancers provided by the formula above is made by combining such ingredients in accordance with the method of making provided in this specification. Fabrics are washed in the compositions shown in Example 1 and friction performance is measured using methods shown in the Methods Section. The data are shown in Table 1.

TABLE 1

Softness Performance of Liquid Fabric Enhancers

| | Reference | Example 1A | Example 1B |
|---|---|---|---|
| Average coefficient of friction | 1.21 | 1.14 | 1.08 |

Examples 2

Liquid Fabric Enhancer

Liquid Fabric Enhancer are prepared by mixing together ingredients shown below:

| EXAMPLE COMPOSITION | 2A | 2B | 2C |
|---|---|---|---|
| Fabric Softener Active[1] | 8 | 8 | 8 |
| Quaternized polyacrylamide[2] | 0.135 | 0.135 | 0.135 |
| Polyester Polymer[5] | 0.1 | 2.0 | 4.0 |
| Water soluble dialkyl quat[4] | 2.0 | 0.2 | 0.2 |
| Water, emulsifiers, suds suppressor, perfume, stabilizers, preservative, antioxidant, chelant, pH control agents, buffers, dyes & other optional ingredients | q.s. to 100% pH = 3.0 | q.s. to 100% pH = 3.0 | q.s. to 100% pH = 3.0 |

The liquid fabric enhancers provided by the formula above are made by combining the listed ingredients in accordance with the method of making provided in this specification. Fabrics are washed in the compositions shown in Example 1 and friction performance is measured using methods shown in the Methods Section.

Examples 3

Liquid Fabric Enhancer

Liquid Fabric Enhancers are prepared by mixing together ingredients shown below:

| EXAMPLE COMPOSITION | A | B | C | D | E | F | U |
|---|---|---|---|---|---|---|---|
| Fabric Softener Active[1] | 7.4 | 5.5 | — | — | — | 9.0 | 7.8 |
| Fabric Softener Active[6] | | | 7.4 | 5.5 | | | |
| Quaternized polyacrylamide[2] | 0.175 | 0.175 | 0.14 | 0.14 | 0.14 | 0.14 | 0.14 |
| Polyester Polymer[7] | 4.4 | 5.5 | 4.4 | 4.4 | 5.5 | 2.2 | 2.2 |
| Water soluble dialkyl quat[4] | 2.3 | 3.0 | 0.2 | 0.2 | 0.2 | 0.2 | 0.2 |
| Perfume | 1.75 | 1.75 | 1.25 | 1.25 | 1.25 | 1.25 | 1.25 |
| Perfume capsule[8] | 0.138 | 0.138 | 0.3 | 0.3 | 0.3 | 0.3 | 0.3 |
| Amino-functional organosiloxane polymer[9] | 1.0 | 3.0 | 2.4 | 2.4 | 1.8 | 1.2 | 1.2 |
| Water, emulsifiers, suds suppressor, stabilizers, preservative, antioxidant, chelant, pH control agents, buffers, dyes & other optional ingredients | q.s. to 100% pH = 3.0 | q.s. to 100% pH = 3.0 | q.s. to 100% pH = 3.0 | q.s. to 100% pH = 3.0 | q.s. to 100% pH = 3.0 | q.s. to 100% pH = 3.0 | q.s. to 100% pH = 3.0 |

The composition provided by the formula above is made by combining such ingredients in accordance with the method of making provided in this specification.

[1] N,N-di(alkanoyloxyethyl)-N,N-dimethylammonium chloride where alkyl consists predominately of C16-C18 alkyl chains with an IV value of about 20 available from Evonik Corp of Hopewell, Va.
[2] Cationic polyacrylamide polymer such as a copolymer of acrylamide/[2-(acryloylamino)ethyl]tri-methylammonium chloride (quaternized dimethyl aminoethyl acrylate) available from BASF, AG, Ludwigshafen.
[3] Polyhydroxystearic acid stearate of molecular weight of about 5000 available from Lubrizol, Inc. of Cleveland, Ohio
[4] Didecyl dimethyl ammonium chloride under the trade name Bardac® 2280 available from Lonza Ltd. of Basel Switzerland or Hydrogenated tallowalkyl (2-ethylhexyl)dimethyl ammonium methylsulfate from AkzoNobel.
[5] ABA type block copolymer of polyhydroxystearic acid-polyethyleneglycol-polyhydroxystearic acid of viscosity 0f 500-100 cps at 50° C. available from Croda, Inc, New York, N.Y.
[6] Methyl bis[ethyl (tallowate)]-2-hydroxyethyl ammonium methyl sulfate available from Stepan Company, Northfield, Ill.
[7] Any of the following branched polyester polymers or mixtures thereof:
   a. Polyhydroxystearic acid stearate of molecular weight of about 2800 available from Croda, Inc, New York, N.Y.
   b. Polyhydroxystearic acid stearate of molecular weight of about available from Lubrizol, Inc. of Cleveland, Ohio.
   c. ABA type block copolymer of polyhydroxystearic acid-polyethyleneglycol-polyhydroxystearic acid of viscosity of 500-100 cps at 50° C. available from Croda, Inc, New York, N.Y.
   d. ABA type block copolymer of polyhydroxystearic acid-polyethyleneglycol-polyhydroxystearic acid of viscosity of 1300-1900 cps at 50° C. available from Croda, Inc, New York, N.Y.
[8] Perfume capsules available from Encapsys, Inc, Appleton, Wis.
[9] Propoxylated Amino-functional organosiloxane polymer as described in U.S. Pat. No. 8,748,646

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid fabric enhancer having a pH of from about 2 to about 5, said liquid fabric enhancer comprising, based on total liquid fabric enhancer weight, from about 1% to about 50%, of a branched polyester polymer having Formula 1

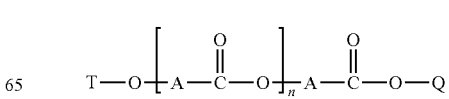

Formula 1 wherein:
each A is independently a branched hydrocarbon chain comprising 4 to 100 carbon atoms;
Q is selected from an alkyl chain comprising 1 to 30 carbon atoms and a hydrogen atom;
T is a hydrogen atom or a —C(O)—R where in each R is an alkyl chain comprising 1 to 30 carbon atoms and n is an integer from 1 to about 100.

2. The liquid fabric enhancer according to claim 1 having a pH of from about 2 to about 5, said liquid fabric enhancer comprising, based on total liquid fabric enhancer weight, from about 1% to about 40% of said branched polyester polymer,
wherein:
each A is independently a branched hydrocarbon chain comprising from 4 to 40 carbon atoms,
Q is selected from an alkyl chain comprising 1 to 30 carbon atoms and a hydrogen atom;
T is a hydrogen atom or a —C(0)—R wherein each R is an alkyl chain comprising from 7 to 21 carbon atoms, and
n is an integer from 4 to 40.

3. The liquid fabric enhancer according to claim 1, wherein said branched polyester polymer having Formula 1 has a weight average molecular weight of from about 500 g/mol to about 100,000 g/mol.

4. The liquid fabric enhancer according to claim 1, wherein each A of said branched polyester polymer is independently a branched hydrocarbon with the structure

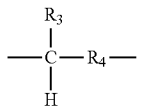

wherein each $R_3$ is a monovalent alkyl or substituted alkyl group and $R_4$ is an unsaturated or saturated divalent alkylene radical comprising from 1 to about 24 carbon atoms.

5. The liquid fabric enhancer according to claim 1, wherein each A of said branched polyester polymer has the structure:

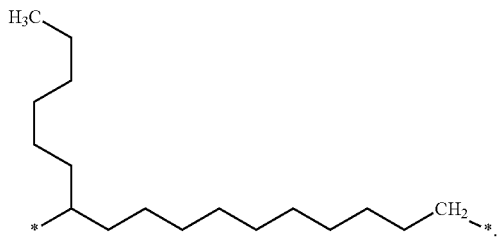

6. The liquid fabric enhancer according to claim 1, wherein said branched polyester polymer has an iodine value from about 0 to about 90.

7. A liquid fabric enhancer according to claim 1, said liquid fabric enhancer comprising, based on total liquid fabric enhancer weight, from about 1% to 50% of a fabric softener active selected from the group consisting of a quaternary ammonium compound, an amine, a fatty ester, a sucrose ester, a silicone, a dispersible polyolefin, a polysaccharide, a fatty acid, a softening oil, a polymer latex, a softening clay and mixtures thereof.

8. A liquid fabric enhancer according to claim 1, said liquid fabric enhancer comprising, based on total liquid fabric enhancer weight, material selected from the group consisting of one or more of the following:
a) from about 0.001% to about 15% of an anionic surfactant scavenger;
b) from about 0.01% to about 10%, of a delivery enhancing agent;
c) from about 0.005% to about 30% of a perfume;
d) from about 0.005% to about 30% of a perfume delivery system;
e) from about 0.0001% to about 10% of a hueing dye;
f) from about 0.0001% to about 10% of a dye transfer inhibiting agent;
g) from about 0.01% to about 20% of a structurant;
h) from about 0.05% to about 20% of a fabric care benefit agent;
i) from about 0.05% to about 10% a surfactant;
j) a carrier; and
k) mixtures thereof.

9. A liquid fabric enhancer according to claim 8 wherein:
a) said anionic surfactant scavenger comprises a water soluble cationic and/or zwitterionic scavenger compound;
b) said delivery enhancing agent comprises a material selected from the group consisting of a cationic polymer having a charge density from about 0.05 milliequivalent/g to about 23 milliequivalent per gram of polymer, an amphoteric polymer having a charge density from about 0.05 milliequivalent/g to about 23 milliequivalent per gram of polymer, a protein having a charge density from about 0.05 milliequivalent/g to about 23 milliequivalent per gram of protein and mixtures thereof;
c) said perfume delivery system is selected from the group consisting of Polymer Assisted Delivery system, Molecule-Assisted Delivery system, Cyclodextrin system, Starch Encapsulated Accord system, Zeolite & Inorganic Carrier system, and mixtures thereof;
d) said hueing dye comprising a moiety selected the group consisting of acridine, anthraquinone, azine, azo, benzodifurane and benzodifuranone, carotenoid, coumarin, cyanine, diazahemicyanine, diphenylmethane, formazan, hemicyanine, indigoid, methane, naphthalimide, naphthoquinone, nitro and nitroso, oxazine, phthalocyanine, pyrazole, stilbene, styryl, triarylmethane, triphenylmethane, xanthene and mixtures thereof;
e) said dye transfer inhibiting agent is selected from the group consisting polyvinylpyrrolidone polymers, polyamine N-oxide polymers, copolymers of N-vinylpyrrolidone and N-vinylimidazole, polyvinyloxazolidones and polyvinylimidazoles or mixtures thereof;
f) said structurant is selected from the group consisting of hydrogenated castor oil, gellan gum, starches, derivatized starches, carrageenan, guar gum, pectin, xanthan gum, modified celluloses, microcrystalline celluloses modified proteins, hydrogenated polyalkylenes, non-hydrogenated polyalkenes, inorganic salts, clay, homo- and co-polymers comprising cationic monomers selected from the group consisting of N,N-dialkylaminoalkyl methacrylate, N,N-dialkylaminoalkyl methyl methacrylate, N,N-dialkylaminoalkyl acrylate, N,N-dialkylaminoalkyl acrylamide, N,N-dialkylaminoalkylmethacrylamide , quaternized N,N-dialkylaminoalkyl methacrylate, quaternized N,N-dialkylaminoalkyl methyl methacrylate, quaternized N,N-dialkylaminoalkyl acrylate, quaternized N,N-dialkylaminoalkyl acrylamide, quaternized N,N-dialkylaminoalkylmethacrylamide, and mixtures thereof;
g) said fabric care benefit agent is selected from the group consisting of polyglycerol esters, oily sugar derivatives, wax emulsions, silicones, polyisobutylene, polyolefins and mixtures thereof;
h) said surfactant is selected from the group consisting of, nonionic surfactants, ampholytic surfactants, cationic surfactants, zwitterionic surfactants, and mixtures thereof;
i) said carrier is selected from the group consisting of water, 1,2-propanediol, hexylene glycol, ethanol, isopropanol, glycerol, $C_1$-$C_4$ alkanolamines, salts, sugars, polyalkylene oxides; polyethylene glycols; polypropylene oxide, and mixtures thereof.

10. A liquid fabric enhancer according to claim 8 wherein:
a) said anionic surfactant scavenger is selected from the group consisting of monoalkyl quaternary ammonium compounds, amine precursors of monoalkyl quaternary ammonium compounds, dialkyl quaternary ammonium compounds, and amine precursors of dialkyl quaternary ammonium compounds, polyquaternary ammonium compounds, amine precursors of polyquaternary ammonium compounds, and mixtures thereof;
b) said delivery enhancing agent is selected from the group consisting of cationic polysaccaharides, polyethyleneimine and its derivatives, polyamidoamines and homopolymers, copolymers and terpolymers made from one or more cationic monomers selected from the group consisting of N,N-dialkylaminoalkyl methacrylate, N,N-dialkylaminoalkyl methyl methacrylate, N,N-dialkylaminoalkyl acrylate, N,N-dialkylaminoalkyl acrylamide, N,N-dialkylaminoalkylmethacrylamide, quaternized N,N-dialkylaminoalkyl methacrylate, quaternized N,N- dialkylaminoalkyl methyl methacrylate, quaternized N,N-dialkylaminoalkyl acrylate, quaternized N,N-dialkylaminoalkyl acrylamide, quaternized N,N-dialkylaminoalkylmethacrylamide, vinylamine and its derivatives, allylamine and its derivatives, vinyl imidazole, quaternized vinyl imidazole and diallyl dialkyl ammonium chloride and combinations thereof, and optionally a second monomer selected from the group consisting of acrylamide, N,N-dialkyl acrylamide, methacrylamide, N,N-dialkylmethacrylamide, $C_1$-$C_{12}$ alkyl acrylate, $C_1$-$C_{12}$ hydroxyalkyl acrylate, polyalkylene glyol acrylate, $C_1$-$C_{12}$ alkyl methacrylate, $C_1$-$C_{12}$ hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole and derivatives, acrylic acid, methacrylic acid, maleic acid, vinyl sulfonic acid, styrene sulfonic acid, acrylamidopropylmethane sulfonic acid (AMPS) and their salts, and combinations thereof;
c) said surfactant is selected from the group consisting of alkyl sulfate, alkyl ethoxysulfate, linear alkylbenzene sulfonate, alpha olefin sulfonate, ethoxylated alcohols, ethoxylated alkyl phenols, fatty acids, soaps, and mixtures thereof;
d) said fabric care benefit agent is selected from the group consisting of polydimethylsiloxane, silicone polyethers, cationic silicone, aminosilicone, and mixtures thereof.

11. A liquid fabric enhancer according to claim 1, comprising:

a) a quaternary ammonium ester softening active of the following formula:

{R2(4-*m*)-N+-[X—Y—R1]*m*}A— wherein:
m is 1, 2 or 3 with proviso that the value of each m is identical;
each R1 is independently hydrocarbyl, or branched hydrocarbyl group;
each R2 is independently a C1-C3 alkyl or hydroxyalkyl group;
each X is independently —(CH2)n-, —CH2-CH(CH3)- or —CH—(CH3)-CH2—and
each n is independently 1, 2, 3 or 4;
each Y is independently —O—(O)C— or —C(O)—O—;
A- is independently selected from the group consisting of chloride, methyl sulfate, and ethyl sulfate;
with the proviso that when Y is —O—(O)C—, the sum of carbons in each R1 is from 13 to 21;
b) a carrier,
c) optionally, an anionic surfactant scavenger selected from the group consisting of a monoalkyl quaternary ammonium compounds and amine precursors thereof, dialkyl quaternary ammonium compounds and amine precursors thereof, polyquaternary ammonium compounds and amine precursors thereof, polymeric amines, and mixtures thereof;
d) optionally, a delivery enhancing agent selected from the group consisting of a cationic polymer having a charge density from about 0.05 milliequivalent/g to about 23 milliequivalent per gram of polymer, an amphoteric polymer having a charge density from about 0.05 milliequivalent/g to about 23 milliequivalent per gram of polymer, a protein having a charge density from about 0.05 milliequivalent/g to about 23 milliequivalent per gram of protein and mixtures thereof;
e) optionally, a dye transfer inhibiting agent selected from the group consisting of polyvinylpyrrolidone polymers, polyamine N-oxide polymers, copolymers of N-vinylpyrrolidone and N-vinylimidazole, polyvinyloxazolidones and polyvinylimidazoles or mixtures thereof;
f) optionally, a structurant selected from the group consisting of hydrogenated castor oil, gellan gum, starches, derivatized starches, carrageenan, guar gum, pectin, xanthan gum, modified celluloses, microcyrstalline celluloses, modified proteins, hydrogenated polyalkylenes, non-hydrogenated polyalkenes, inorganic salts selected from the group consisting of magnesium chloride, calcium chloride, calcium formate, magnesium formate, aluminum chloride, potassium permanganate and mixtures thereof, clay, homo- and co-polymers comprising cationic monomers selected from the group consisting of N,N-dialkylaminoalkyl methacrylate, N,N-dialkylaminoalkyl methyl methacrylate, N,N-dialkylaminoalkyl acrylate, N,N-dialkylaminoalkyl acrylamide, N,N-dialkylaminoalkylmethacrylamide, quaternized N,N-dialkylaminoalkyl methacrylate, quaternized N,N-dialkylaminoalkyl methyl methacrylate, quaternized N,N-dialkylaminoalkyl acrylate, quaternized N,N-dialkylaminoalkyl acrylamide, quaternized N,N-dialkylaminoalkylmethacrylamide, and mixtures thereof; and
g) optionally, a fabric care benefit agent selected from the group consisting of polyglycerol esters, oily sugar derivatives, wax emulsions, silicones, polyisobutylene, polyolefins and mixtures thereof; and h) optionally a perfume; and i) optionally a perfume delivery system;

said liquid fabric enhancer having a pH of from about 2 to about 5.

12. A liquid fabric enhancer according to claim 1, comprising:

a) a surfactant selected from the group consisting of anionic surfactants, nonionic surfactants, ampholytic surfactants, cationic surfactants, zwitterionic surfactants, and mixtures thereof;

b) a carrier;

c) optionally, a builder selected from the group consisting of phosphate salts, water-soluble, nonphosphorus organic builders, alkali metal, ammonium and substituted ammonium polyacetates, carboxylates, polycarboxylates, polyhydroxy sulfonates, and mixtures thereof;

d) optionally, a soil dispersing polymer selected from the group consisting of a homopolymer copolymer or terpolymer of an ethylenically unsaturated monomer anionic monomer, alkoxylated polyamines and mixtures thereof;

e) optionally, a delivery enhancing agent selected from the group consisting of a cationic polymer having a charge density from about 0.05 milliequivalent/g to about 23 milliequivalent per gram of polymer, an amphoteric polymer having a charge density from about 0.05 milliequivalent/g to about 23 milliequivalent per gram of polymer, a protein having a charge density from about 0.05 milliequivalent/g to about 23 milliequivalent per gram of protein and mixtures thereof;

f) optionally, a brightener selected from the group consisting of derivatives of stilbene or 4,4'-diaminostilbene, biphenyl, five-membered heterocycles, pyrazolines, oxazoles, imidiazoles, six-membered heterocycles, and mixtures thereof;

g) optionally, a hueing dye comprising a moiety selected the group consisting of acridine, anthraquinone azine, azo, benzodifurane and benzodifuranone, carotenoid, coumarin, cyanine, diazahemicyanine, diphenylmethane, formazan, hemicyanine, indigoid, methane, naphthalimide, naphthoquinone, nitro and nitroso, oxazine, phthalocyanine, pyrazole, stilbene, styryl, triarylmethane, triphenylmethane, xanthene and mixtures thereof;

h) optionally, a dye transfer inhibiting agent selected from the group consisting polyvinylpyrrolidone polymers, polyamine N-oxide polymers, copolymers of N-vinylpyrrolidone and N-vinylimidazole, polyvinyloxazolidones and polyvinylimidazoles or mixtures thereof;

i) optionally, a structurant selected from the group consisting of hydrogenated castor oil, gellan gum, starches, derivatized starches, carrageenan, guar gum, pectin, xanthan gum, modified celluloses, microcyrstalline celluloses, modified proteins, hydrogenated polyalkylenes, non-hydrogenated polyalkenes, inorganic salts, clay, homo- and co-polymers comprising cationic monomers selected from the group consisting of N,N-dialkylaminoalkyl methacrylate, N,N-dialkylaminoalkyl methyl methacrylate N,N-dialkylaminoalkyl acrylate, N,N-dialkylaminoalkyl acrylamide, N,N-dialkylaminoalkylmethacrylamide, quaternized N,N-dialkylaminoalkyl methacrylate, quaternized N,N-dialkylaminoalkyl methyl methacrylate, quaternized N,N-dialkylaminoalkyl acrylate, quaternized N,N-dialkylaminoalkyl acrylamide, quaternized N,N-dialkylaminoalkylmethacrylamide, and mixtures thereof,;

j) optionally, a fabric care benefit agent selected from the group consisting of polyglycerol esters, oily sugar derivatives, wax emulsions, silicones, polyisobutylene, polyolefins and mixtures thereof; and k) optionally a perfume;

l) optionally a perfume delivery system;

said liquid fabric enhancer having a pH of from about 4 to about 5.

13. A liquid fabric enhancer according to claim 1, comprising:

a) a fabric softening agent, a perfume, and a delivery enhancing agent; or b) a fabric softening agent, a perfume and a perfume delivery system; or c) a hueing dye and a surfactant; or d) a fabric softening agent, a fabric care benefit agent and a delivery enhancing agent; or e) a fabric care benefit agent, anionic surfactant scavenger and a delivery enhancing agent; or f) a perfume delivery system.

14. A fabric treated with a liquid fabric enhancer according to claim 1.

15. A method of treating and/or cleaning a fabric, said method comprising a) optionally washing and/or rinsing said fabric;

b) acting said fabric with a liquid fabric enhancer according to claim 1;

c) optionally washing and/or rinsing said fabric; and d) optionally passively or actively drying said fabric.

* * * * *